(12) United States Patent
Floyd-Jones et al.

(10) Patent No.: US 12,017,364 B2
(45) Date of Patent: Jun. 25, 2024

(54) MOTION PLANNING GRAPH GENERATION USER INTERFACE, SYSTEMS, METHODS AND ARTICLES

(71) Applicant: Realtime Robotics, Inc., Boston, MA (US)

(72) Inventors: William Floyd-Jones, Boston, MA (US); Sean Murray, Cambridge, MA (US); Matthew Ryan, Milton, MA (US); Arne Sieverling, Somerville, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 325 days.

(21) Appl. No.: 17/604,285

(22) PCT Filed: Apr. 15, 2020

(86) PCT No.: PCT/US2020/028343
§ 371 (c)(1),
(2) Date: Oct. 15, 2021

(87) PCT Pub. No.: WO2020/214723
PCT Pub. Date: Oct. 22, 2020

(65) Prior Publication Data
US 2022/0193911 A1    Jun. 23, 2022

Related U.S. Application Data

(60) Provisional application No. 62/835,139, filed on Apr. 17, 2019.

(51) Int. Cl.
*B25J 9/16* (2006.01)
(52) U.S. Cl.
CPC .......... *B25J 9/1671* (2013.01); *B25J 9/1666* (2013.01); *G05B 2219/40099* (2013.01)

(58) Field of Classification Search
CPC ...... B25J 9/1671; B25J 9/1666; B25J 9/1664; G05B 2219/40099; G05B 2219/40108; G05B 2219/40392
See application file for complete search history.

(56) References Cited

U.S. PATENT DOCUMENTS

| 4,163,183 A | 7/1979 | Dunne et al. |
| 4,300,198 A | 11/1981 | Davini |

(Continued)

FOREIGN PATENT DOCUMENTS

| CN | 101837591 A | 9/2010 |
| CN | 102814813 A | 12/2012 |

(Continued)

OTHER PUBLICATIONS

Hassan, "Modeling and Stochastic Optimization of Complete Coverage under Uncertainties in Multi-Robot Base Placements," 2016, Intelligent Robots and Systems (IROS} (Year: 2016).

(Continued)

*Primary Examiner* — Jaime Figueroa
*Assistant Examiner* — Benjamin J Brosh
(74) *Attorney, Agent, or Firm* — Cozen O'Connor

(57) ABSTRACT

A processor-based system provides a user interface to facilitate generation of motion planning graphs or roadmaps, for example via autonomous generate of additional poses, for example neighboring poses, based on specified seed or origin pose, and/or generate or sub-lattice connecting poses and/or edges to couple separate regions or sub-lattices of the motion planning graph together. Such may include performing collision-checking and/or kinematic checking (e.g., taking into account kinematic constraints of robots being modeled). The resulting motion planning graphs or roadmaps are (Continued)

useful in controlling robots during runtime. Robots may include robots with appendages and/or robots in the form of autonomous vehicles.

20 Claims, 14 Drawing Sheets

(56) References Cited

U.S. PATENT DOCUMENTS

| | | | |
|---|---|---|---|
| 4,862,373 A | 8/1989 | Meng | |
| 4,949,277 A | 8/1990 | Trovato et al. | |
| 5,347,459 A | 9/1994 | Greenspan et al. | |
| 5,544,282 A | 8/1996 | Chen et al. | |
| 6,004,016 A | 12/1999 | Spector | |
| 6,049,756 A | 4/2000 | Libby | |
| 6,089,742 A | 7/2000 | Warmerdam et al. | |
| 6,259,988 B1 | 7/2001 | Galkowski et al. | |
| 6,470,301 B1 | 10/2002 | Barral | |
| 6,493,607 B1 | 12/2002 | Bourne et al. | |
| 6,526,372 B1 | 2/2003 | Orschel et al. | |
| 6,526,373 B1 | 2/2003 | Barral | |
| 6,529,852 B2 | 3/2003 | Knoll et al. | |
| 6,539,294 B1 | 3/2003 | Kageyama | |
| 6,629,037 B1 | 9/2003 | Nyland | |
| 6,671,582 B1 | 12/2003 | Hanley | |
| 7,577,498 B2 | 8/2009 | Jennings et al. | |
| 7,609,020 B2 | 10/2009 | Kniss et al. | |
| 7,865,277 B1 | 1/2011 | Larson et al. | |
| 7,940,023 B2 | 5/2011 | Kniss et al. | |
| 8,082,064 B2 | 12/2011 | Kay | |
| 8,315,738 B2 | 11/2012 | Chang et al. | |
| 8,571,706 B2 | 10/2013 | Zhang et al. | |
| 8,666,548 B2 | 3/2014 | Lim | |
| 8,825,207 B2 | 9/2014 | Kim et al. | |
| 8,825,208 B1 | 9/2014 | Benson | |
| 8,855,812 B2 | 10/2014 | Kapoor | |
| 8,880,216 B2 | 11/2014 | Izumi et al. | |
| 8,972,057 B1 | 3/2015 | Freeman et al. | |
| 9,092,698 B2 | 7/2015 | Buehler et al. | |
| 9,102,055 B1 | 8/2015 | Konolige et al. | |
| 9,227,322 B2 | 1/2016 | Graca et al. | |
| 9,280,899 B2 | 3/2016 | Biess et al. | |
| 9,327,397 B1 | 5/2016 | Williams et al. | |
| 9,333,044 B2 | 5/2016 | Olson | |
| 9,434,072 B2 | 9/2016 | Buehler et al. | |
| 9,539,058 B2 | 1/2017 | Tsekos et al. | |
| 9,632,502 B1 | 4/2017 | Levinson et al. | |
| 9,645,577 B1 | 5/2017 | Frazzoli et al. | |
| 9,687,982 B1 | 6/2017 | Jules et al. | |
| 9,687,983 B1 | 6/2017 | Prats | |
| 9,701,015 B2 | 7/2017 | Buehler et al. | |
| 9,707,682 B1 | 7/2017 | Konolige et al. | |
| 9,731,724 B2 | 8/2017 | Yoon | |
| 9,981,382 B1 | 5/2018 | Strauss et al. | |
| 9,981,383 B1 | 5/2018 | Nagarajan | |
| 10,035,266 B1 | 7/2018 | Kroeger | |
| 10,099,372 B2 | 10/2018 | Vu et al. | |
| 10,124,488 B2 | 11/2018 | Lee et al. | |
| 10,131,053 B1 | 11/2018 | Sampedro et al. | |
| 10,300,605 B2 | 5/2019 | Sato | |
| 10,303,180 B1 | 5/2019 | Prats | |
| 10,430,641 B2 | 10/2019 | Gao | |
| 10,705,528 B2 | 7/2020 | Wierzynski et al. | |
| 10,723,024 B2 | 7/2020 | Konidaris et al. | |
| 10,782,694 B2 | 9/2020 | Zhang et al. | |
| 10,792,114 B2 | 10/2020 | Hashimoto et al. | |
| 10,959,795 B2 | 3/2021 | Hashimoto et al. | |
| 11,314,254 B2 * | 4/2022 | Macias | H04N 5/2226 |
| 11,358,337 B2 | 6/2022 | Czinger et al. | |
| 11,623,494 B1 | 4/2023 | Arnicar et al. | |
| 2002/0013675 A1 | 1/2002 | Knoll et al. | |
| 2002/0074964 A1 | 6/2002 | Quaschner et al. | |
| 2003/0155881 A1 | 8/2003 | Hamann et al. | |
| 2004/0249509 A1 | 12/2004 | Rogers et al. | |
| 2005/0071048 A1 | 3/2005 | Watanabe et al. | |
| 2005/0216181 A1 | 9/2005 | Estkowski et al. | |
| 2006/0235610 A1 | 10/2006 | Ariyur et al. | |
| 2006/0241813 A1 | 10/2006 | Babu et al. | |
| 2006/0247852 A1 | 11/2006 | Kortge et al. | |
| 2007/0106422 A1 | 5/2007 | Jennings et al. | |
| 2007/0112700 A1 | 5/2007 | Den et al. | |
| 2008/0012517 A1 | 1/2008 | Kniss et al. | |
| 2008/0125893 A1 | 5/2008 | Tilove et al. | |
| 2008/0186312 A1 | 8/2008 | Ahn et al. | |
| 2008/0234864 A1 | 9/2008 | Sugiura et al. | |
| 2009/0055024 A1 | 2/2009 | Kay | |
| 2009/0192710 A1 | 7/2009 | Eidehall et al. | |
| 2009/0234499 A1 | 9/2009 | Nielsen et al. | |
| 2009/0295323 A1 | 12/2009 | Papiernik et al. | |
| 2009/0326711 A1 | 12/2009 | Chang et al. | |
| 2009/0326876 A1 | 12/2009 | Miller | |
| 2010/0145516 A1 | 6/2010 | Cedoz et al. | |
| 2010/0235033 A1 | 9/2010 | Yamamoto et al. | |
| 2011/0036188 A1 | 2/2011 | Fujioka et al. | |
| 2011/0066282 A1 | 3/2011 | Bosscher et al. | |
| 2011/0153080 A1 | 6/2011 | Shapiro et al. | |
| 2011/0264111 A1 | 10/2011 | Nowlin et al. | |
| 2012/0010772 A1 | 1/2012 | Pack et al. | |
| 2012/0083964 A1 | 4/2012 | Montemerlo et al. | |
| 2012/0215351 A1 | 8/2012 | McGee et al. | |
| 2012/0297733 A1 | 11/2012 | Pierson et al. | |
| 2012/0323357 A1 | 12/2012 | Izumi et al. | |
| 2013/0076866 A1 | 3/2013 | Drinkard et al. | |
| 2013/0346348 A1 | 12/2013 | Buehler et al. | |
| 2014/0012419 A1 | 1/2014 | Nakajima | |
| 2014/0025201 A1 | 1/2014 | Ryu et al. | |
| 2014/0025203 A1 | 1/2014 | Inazumi | |
| 2014/0058406 A1 | 2/2014 | Tsekos | |
| 2014/0067121 A1 | 3/2014 | Brooks et al. | |
| 2014/0079524 A1 | 3/2014 | Shimono et al. | |
| 2014/0121833 A1 | 5/2014 | Lee et al. | |
| 2014/0121837 A1 | 5/2014 | Hashiguchi et al. | |
| 2014/0147240 A1 | 5/2014 | Noda et al. | |
| 2014/0156068 A1 | 6/2014 | Graca et al. | |
| 2014/0249741 A1 | 9/2014 | Levien et al. | |
| 2014/0251702 A1 | 9/2014 | Berger et al. | |
| 2014/0309916 A1 | 10/2014 | Bushnell | |
| 2015/0005785 A1 | 1/2015 | Olson | |
| 2015/0037131 A1 | 2/2015 | Girtman et al. | |
| 2015/0051783 A1 | 2/2015 | Tamir et al. | |
| 2015/0134111 A1 | 5/2015 | Nakajima | |
| 2015/0261899 A1 | 9/2015 | Atohira et al. | |
| 2015/0266182 A1 | 9/2015 | Strandberg | |
| 2016/0001775 A1 | 1/2016 | Wilhelm et al. | |
| 2016/0008078 A1 | 1/2016 | Azizian et al. | |
| 2016/0107313 A1 | 4/2016 | Hoffmann et al. | |
| 2016/0112694 A1 | 4/2016 | Nishi et al. | |
| 2016/0121486 A1 | 5/2016 | Lipinski et al. | |
| 2016/0121487 A1 | 5/2016 | Mohan et al. | |
| 2016/0154408 A1 | 6/2016 | Eade et al. | |
| 2016/0161257 A1 | 6/2016 | Simpson et al. | |
| 2016/0299507 A1 | 10/2016 | Shah et al. | |
| 2016/0324587 A1 | 11/2016 | Olson | |
| 2016/0357187 A1 | 12/2016 | Ansari | |
| 2017/0001775 A1 | 1/2017 | Cimmerer et al. | |
| 2017/0004406 A1 | 1/2017 | Aghamohammadi | |
| 2017/0028559 A1 | 2/2017 | Davidi et al. | |
| 2017/0120448 A1 | 5/2017 | Lee et al. | |
| 2017/0123419 A1 | 5/2017 | Levinson et al. | |
| 2017/0132334 A1 | 5/2017 | Levinson et al. | |
| 2017/0146999 A1 | 5/2017 | Cherepinsky et al. | |
| 2017/0157769 A1 | 6/2017 | Aghamohammadi et al. | |
| 2017/0168485 A1 | 6/2017 | Berntorp et al. | |
| 2017/0168488 A1 | 6/2017 | Wierzynski et al. | |
| 2017/0193830 A1 | 7/2017 | Fragoso et al. | |
| 2017/0210008 A1 | 7/2017 | Maeda | |
| 2017/0219353 A1 | 8/2017 | Alesiani | |
| 2017/0305015 A1 | 10/2017 | Krasny et al. | |
| 2017/0315530 A1 | 11/2017 | Godau et al. | |
| 2018/0001472 A1 * | 1/2018 | Konidaris | B25J 9/1666 |
| 2018/0001476 A1 | 1/2018 | Tan et al. | |
| 2018/0029231 A1 | 2/2018 | Davis | |
| 2018/0029233 A1 | 2/2018 | Lager | |
| 2018/0032039 A1 | 2/2018 | Huynh et al. | |

(56) References Cited

U.S. PATENT DOCUMENTS

| | | |
|---|---|---|
| 2018/0074505 A1 | 3/2018 | Lv et al. |
| 2018/0113468 A1 | 4/2018 | Russell |
| 2018/0136662 A1 | 5/2018 | Kim |
| 2018/0150077 A1 | 5/2018 | Danielson et al. |
| 2018/0172450 A1 | 6/2018 | Lalonde et al. |
| 2018/0173242 A1 | 6/2018 | Lalonde et al. |
| 2018/0189683 A1 | 7/2018 | Newman |
| 2018/0222050 A1 | 8/2018 | Vu et al. |
| 2018/0222051 A1 | 8/2018 | Vu et al. |
| 2018/0229368 A1 | 8/2018 | Leitner et al. |
| 2018/0281786 A1 | 10/2018 | Oyaizu et al. |
| 2018/0339456 A1 | 11/2018 | Czinger et al. |
| 2019/0015981 A1 | 1/2019 | Yabushita et al. |
| 2019/0039242 A1 | 2/2019 | Fujii et al. |
| 2019/0101930 A1 | 4/2019 | Yadmellat |
| 2019/0143518 A1 | 5/2019 | Maeda |
| 2019/0163191 A1 | 5/2019 | Sorin et al. |
| 2019/0164430 A1 | 5/2019 | Nix |
| 2019/0196480 A1 | 6/2019 | Taylor |
| 2019/0216555 A1 | 7/2019 | Dimaio et al. |
| 2019/0232496 A1 | 8/2019 | Graichen et al. |
| 2019/0240835 A1* | 8/2019 | Sorin .................. G05D 1/0214 |
| 2019/0262993 A1 | 8/2019 | Cole et al. |
| 2019/0293443 A1 | 9/2019 | Kelly et al. |
| 2019/0391597 A1 | 12/2019 | Dupuis |
| 2020/0069134 A1 | 3/2020 | Ebrahimi Afrouzi et al. |
| 2020/0097014 A1 | 3/2020 | Wang |
| 2020/0215686 A1 | 7/2020 | Vijayanarasimhan et al. |
| 2020/0331146 A1 | 10/2020 | Vu et al. |
| 2020/0338730 A1 | 10/2020 | Yamauchi et al. |
| 2020/0338733 A1 | 10/2020 | Dupuis et al. |
| 2020/0353917 A1 | 11/2020 | Leitermann et al. |
| 2020/0368910 A1 | 11/2020 | Chu et al. |
| 2021/0009351 A1 | 1/2021 | Beinhofer et al. |
| 2022/0339875 A1 | 10/2022 | Czinger et al. |
| 2023/0063205 A1 | 3/2023 | Nerkar |

FOREIGN PATENT DOCUMENTS

| | | |
|---|---|---|
| CN | 103722565 A | 4/2014 |
| CN | 104407616 A | 3/2015 |
| CN | 104858876 A | 8/2015 |
| CN | 102186638 B | 3/2016 |
| CN | 106660208 A | 5/2017 |
| CN | 107073710 A | 8/2017 |
| CN | 107206592 A | 9/2017 |
| CN | 107486858 A | 12/2017 |
| CN | 108297059 A | 7/2018 |
| CN | 108453702 A | 8/2018 |
| CN | 108789416 A | 11/2018 |
| CN | 108858183 A | 11/2018 |
| CN | 108942920 A | 12/2018 |
| CN | 109521763 A | 3/2019 |
| CN | 109782763 B | 11/2021 |
| CN | 114073585 A | 2/2022 |
| EP | 1901150 A1 | 3/2008 |
| EP | 2306153 A2 | 4/2011 |
| EP | 3250347 A1 | 12/2017 |
| EP | 3486612 A1 | 5/2019 |
| EP | 3725472 A1 | 10/2020 |
| JP | 07100755 | 4/1995 |
| JP | 1148177 | 2/1999 |
| JP | 11296229 A | 10/1999 |
| JP | 2002073130 A | 3/2002 |
| JP | 2003127077 A | 5/2003 |
| JP | 2005032196 A | 2/2005 |
| JP | 2006224740 A | 8/2006 |
| JP | 2007257274 A | 10/2007 |
| JP | 2007531110 A | 11/2007 |
| JP | 2008065755 A | 3/2008 |
| JP | 2008134165 A | 6/2008 |
| JP | 2010061293 A | 3/2010 |
| JP | 2010210592 A | 9/2010 |
| JP | 2011075382 A | 4/2011 |
| JP | 2011249711 A | 12/2011 |
| JP | 2012056023 A | 3/2012 |
| JP | 2012190405 A | 10/2012 |
| JP | 2012243029 A | 12/2012 |
| JP | 2013193194 A | 9/2013 |
| JP | 2014184498 A | 10/2014 |
| JP | 2015044274 A | 3/2015 |
| JP | 2015517142 A | 6/2015 |
| JP | 2015208811 A | 11/2015 |
| JP | 2016099257 A | 5/2016 |
| JP | 2017131973 A | 8/2017 |
| JP | 2017136677 A | 8/2017 |
| JP | 2017148908 A | 8/2017 |
| JP | 2018505788 A | 3/2018 |
| JP | 2018134703 A | 8/2018 |
| JP | 2018144158 A | 9/2018 |
| JP | 2018144166 A | 9/2018 |
| KR | 19980024584 A | 7/1998 |
| KR | 20110026776 A | 3/2011 |
| KR | 20130112507 A | 10/2013 |
| KR | 20150126482 A | 11/2015 |
| KR | 20170018564 A | 2/2017 |
| KR | 20170044987 A | 4/2017 |
| KR | 20170050166 A | 5/2017 |
| KR | 20180125646 A | 11/2018 |
| TW | 201318793 A | 5/2013 |
| TW | 615691 | 2/2018 |
| TW | 653130 | 3/2019 |
| WO | 9924914 A1 | 5/1999 |
| WO | 2015113203 A1 | 8/2015 |
| WO | 2016122840 A1 | 8/2016 |
| WO | 2017168187 A1 | 10/2017 |
| WO | 2017214581 A1 | 12/2017 |
| WO | 2018043525 A1 | 3/2018 |
| WO | 2019183141 A1 | 9/2019 |
| WO | 2020040979 A1 | 2/2020 |
| WO | 2020117958 A1 | 6/2020 |

OTHER PUBLICATIONS

Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).

Hassan, et al., "Simultaneous area partitioning and allocation for complete coverage by multiple autonomous industrial robots," 2017, Autonomous Robots 41, pp. 1609-1628 (Year: 2017).

Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.

Kalawoun, "Motion planning of multi-robot system for airplane stripping," 2019, Universite Clermont Auvergne (Year: 2019).

Kapanoglu, et al., "A pattern-based genetic algorithm for multi-robot coverage path planning minimizing completion time," 2012, Journal of Intelligent Manufacturing 23, pp. 1035-1045 (Year: 2012).

Notice of Allowance for U.S. Appl. No. 17/153,662, dated Dec. 6, 2022, 15 pages.

Pires, et al., "Robot Trajectory Planning Using Multi-objective Genetic Algorithm Optimization," 2004, Genetic and Evolutionary Computation—GECCO 2004, pp. 615-626 (Year: 2004).

Sicilliano et al. "Robotics. Modelling, Planning and Control", Chapter 12: Motion Planning, pp. 523-559, 2009.

Chen, Chao, Motion Planning for Nonholonomic Vehicles with Space Exploration Guided Heuristic Search, 2016, IEEE.com, Whole Document, 140 pages.

Pan, Jia, et al., Efficient Configuration Space Construction and Optimization for Motion Planning, 2015, Research Robotics, Whole Document, 12 pages.

Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.

Extended EP Search Report dated Nov. 7, 2022, EP App No. 21744840.6-1205, 14 pages.

(56) References Cited

OTHER PUBLICATIONS

Klampfl Erica et al: "Optimization of workcell layouts in a mixed-model assembly line environment", International Journal of Flexible Manufacturing Systems, Kluwer Academic Publishers, Boston, vol. 17, No. 4, 23 pages, Oct. 10, 2006.
Long Tao et al: "Optimization on multi-robot workcell layout in vertical plane", Information and Automation (ICIA), 2011 IEEE International Conference on, IEEE, Jun. 6, 2011, 6 pages.
Pashkevich AP et al: "Multiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
Christian Potthast et al: "Seeing with your hands: A Better way to obtain perception capablities with a personal robot", Advance Robotics and Its Social Impacts, Oct. 2, 2011, pp. 50-53. xp032235164.
Communication Pursuant to Article 94(3) EPC, dated Jul. 12, 2023, for European Application No. 19 893 874.8-1205, 5 pages.
Efrain Lopez-Damian et al: "Probabilistic view planner for 3D modelling indoor environments", Intelligent Robots and Systems, 2009. Oct. 10, 2009, pp. 4021-4026, xp031580735.
EP Search Report dated Sep. 1, 2023, EP App No. 21789270.2-1205 /4135940 PCT/US2021026818—23 pages.
Final Office Action for U.S. Appl. No. 17/506,364, dated Aug. 25, 2023, 55 pages.
Final Office Action for U.S. Appl. No. 17/682,732, dated Jul. 7, 2023, 46 pages.
First Office Action issued in Chinese No. 201980055188.0 with English translation, dated Jul. 1, 2023, 16 pages.
First Office Action issued in Chinese No. 201980080759.6 with English translation, dated Jun. 28, 2023, 4 pages.
First Office Action issued in Chinese No. 202080055382.1 with English translation, dated Jun. 28, 2023, 30 pages.
International Search Report and Written Opinion for PCT/US2023/ 064012, dated Jul. 10, 2023, 15 pages.
Kececi F et al:"Improving Visually Servoed Disassembly Operations by Automatic Camera Placement", Proceedings of the 1998 IEEE International Conference on Robotics and Automation. ICRA '98. May 16-20, 1998; New York, NY : IEEE, US ,XP000784527.
Non-Final Office Action Issued in U.S. Appl. No. 17/270,597, dated Aug. 18, 2023, 25 pages.
Notice of Reasons for Refusal for Japanese Patent Application No. 2021-571340, dated Aug. 8, 2023, 8 pages.
Notice of Reasons for Refusal for Japanese Patent Application No. 2022-562247, dated Sep. 25, 2023, 7 pages.
Notice of Reasons for Refusal. Japanese Application No. 2022-556467, dated Sep. 28, 2023, 10 pages.
Office Action, ROC (Taiwan) Pat. Appln. No. 108130161 and Search Report—APP.108130161—dated Sep. 19, 2023.
Bharathi Akilan et al: "Feedrate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
Extended EP Search Report dated Jul. 18, 2022 EP App No. 20832308.9-1205, 10 pages.
Extended EP Search Report dated Jul. 25, 2022 EP App No. 20857383.2-1205, 10 pages.
Sonja Macfarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Final Office Action dated Sep. 7, 2022, for U.S. Appl. No. 16/909,096, 54 pages.
Gasparetto A et al: "Experimental validation and comparative analysis of optimal time-jerk algorithms for trajectory planning", Robotics and Computer Integrated Manufacturing, Elsevier Science Publishers BV. , Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Non Final Office Action for U.S. Appl. No. 16/883,376, dated Sep. 27, 2022, 26 pages.
Non-Final Office Action dated Sep. 14, 2022, for U.S. Appl. No. 16/999,339, 18 pages.
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
S. Saravana Perumaal et al: "Automated Trajectory Planner of Industrial Robot for Pick-and-Place Task", International Journal of Advanced Robotic Systems, vol. 10, No. 2, Jan. 1, 2013.
Notice of Reasons for Rejection dated Feb. 16, 2023, for Japanese Application No. 2021-571340, 10 pages.
Office Action issued in Taiwan Application No. 108104094, dated Feb. 6, 2023, 24 pages.
International Search Report and Written Opinion for PCT/US2021/ 061427, dated Apr. 29, 2022, 14 pages.
Non-Final Office Action Issued in U.S. Appl. No. 16/909,096 dated May 6, 2022, 49 pages.
Japanese Office Action, Japanese Application No. 2021-576425, dated Mar. 13, 2023, 14 pages.
Extended EP Search Report dated May 10, 2023, EP App No. 20818760.9-1012, 9 pages.
First Office Action and Search Report issued in Chinese No. 202080040382.4 with English translation, dated May 26, 2023, 15 pages.
First Office Action issued in Chinese No. 202080059714.3 with English translation, dated May 24, 2023, 24 pages.
Li, et al., "A Novel Cost Function for Decision-Making Strategies in Automotive Collision Avoidance Systems", 2018 IEEE, ICVES, 8 pages.
Non-Final Office Action Issued in U.S. Appl. No. 17/506,364, dated Apr. 28, 2023, 50 pages.
Schwesinger, "Motion Planning n Dynamic Environments with Application to Self-Driving Vehicles", Dr. Andreas Krause, Jan. 1, 2017, XP093029842.
First Office Action issued in Chinese No. 201980024188.4 with English translation, dated Feb. 22, 2023, 28 pages.
Non-Final Office Action Issued in U.S. Appl. No. 16/981,467, dated Mar. 16, 2023, 19 Pages.
Notice of Reasons for Rejection dated Feb. 7, 2023, for Japanese Application No. 2022-054900, 7 pages.
International Search Report and Written Opinion, dated Jul. 29, 2020, in PCT/US2020/028343, 11 pages.
or.pdf (Or | Definition of Or by Merriam-Webster, Sep. 9, 2019, https://www.merriam-webster.com/dictionary/or, pp. 1-12; Year: 2019.
Taiwanese First Office Action—Application No. 106119452 dated Jun. 18, 2021, 25 pages.
Atay, Nuzhet , et al., "A Motion Planning Processor on Reconfigurable Hardware", All Computer Science and Engineering Research, Computer Science and Engineering; Report No. WUCSE-2005-46; Sep. 23, 2005.
Corrales, J.A. , et al., Safe Human-robot interaction based on dynamic sphere-swept line bounding volumes, Robotic and Computer-Integrated Manufacturing 27 (2011) 177-185, 9 page.

(56) References Cited

OTHER PUBLICATIONS

Hauck, Scott, et al., "Configuration Compression for the Xilinx XC6200 FPGA", IEEE Transactions on Computer-Aided Design of Integrated Circuits and Systems, vol. 18, No. 8; Aug. 1999.

Johnson, David E., et al., "Bound Coherence for Minimum Distance Computations", Proceedings of the 1999 IEEE International Conference on Robotics and Automation, May 1999.

Kavraki, L.E., et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.

Murray, Sean, et al., "Robot Motion Planning on a Chip", Robotics: Science and Systems, Jan. 1, 2016, 9 pages.

Murray, Sean, et al., "Robot Motion Planning on a Chip", Robotics: Science and Systems 2016; Jun. 22, 2016; 9 pages.

Murray, Sean, et al., "The microarchitecture of a real-time robot motion planning accelerator", 2016 49th Annual IEEE/ACM International Symposium on Microarchitecture (Micro), IEEE, Oct. 15, 2016, 12 pages.

Pobil, Angel P, et al., "A New Representation for Collision Avoidance and Detection", Proceedings of the 1992 IEEE, XP000300485, pp. 246-251.

Rodriguez, Carlos, et al., "Planning manipulation movements of a dual-arm system considering obstacle removing", Robotics and Autonomous Systems 62 (2014), Elsevier, Journal homepage: www.elsevier.com/locate/robot, pp. 1816-1826.

Rodriguez, Carlos, et al., "Planning manipulation movements of a dual-arm system considering obstacle removing", Robotics and Autonomous Systems, Elsevier Science Publishers, vol. 62, No. 12, pp. 1816-1826; Aug. 1, 2014.

Sato, Yuichi, et al., "Efficient Collision Detection using Fast Distance-Calculation Algorithms for Convex and Non-Convex Objects", Proceeding of the 1996 IEEE, XP-000750294, 8 pages.

Stilman, Mike, et al., "Manipulation Planning Among Movable Obstacles", Proceedings of the IEEE Int. Conf. on Robotics and Automation, Apr. 2007.

Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.

Extended EP Search Report dated Jan. 29, 2024, EP App No. 21772200.8-1205, 9 pages.

Office Action issued in Taiwan Application No. 109113033, dated Jan. 19, 2024, 10 pages.

Office Action issued in Taiwan Application No. 109118558, dated Jan. 4, 2024, 8 pages.

Final Office Action Issued in U.S. Appl. No. 17/270,597, dated Oct. 27, 2023, 29 pages.

Notice of Reasons for Refusal dated Nov. 27, 2023, for Japanese Application No. 2021-561986, 10 pages.

Oleynikova, et al., "Singed Distance Fields: A Natural Representation for Both Mapping and Planning", 2016, 7 pages.

Taiwanese First Office Action—Application No. 109120779 dated Nov. 9, 2023, 11 pages.

Japanese Decision of Registration for JP 2022-054900, dated Jan. 9, 2024, 3 pages.

* cited by examiner

Figure - Attaching a collision part

MOTION PLANNING GRAPH GENERATION USER INTERFACE, SYSTEMS, METHODS AND ARTICLES

TECHNICAL FIELD

The present disclosure generally relates to robot motion planning, and in particular to user interfaces, systems, methods and articles that facilitate generation of motion planning graphs useful in motion planning for robots.

BACKGROUND

Description of the Related Art

Motion planning is a fundamental problem in robot control and robotics, including robots with moveable appendages and autonomous or semi-autonomous vehicles. A motion plan completely specifies a path a robot can follow from a starting state or pose to a goal state or pose, typically without colliding with any obstacles in an operational environment or with a reduced possibility of colliding with any obstacles in the operational environment. Challenges to motion planning involve the ability to perform motion planning at a relatively low cost and very fast speeds that account for the kinematics of the robot itself as well as the obstacles in the operational, even as characteristics of the robot itself change. For example, such characteristics may include the volume considered occupied by the robot when the robot is holding objects of various sizes, when changing to a different end effector or when changing to a different appendage. Also, there are also challenges with respect to a limited amount of motion planning information that could be stored on processor chip circuitry.

BRIEF SUMMARY

A motion planning graph toolkit allows creation or generation of a motion planning graph (interchangeably referred to herein as a roadmap or roadmap file or lattice) that is used by a motion planner (e.g., the Realtime Robotic Motion Planning Accelerator and the RapidSense Spatial Perception system). The motion planning graph toolkit is implemented as processor-executable instructions or application (e.g., software and/or firmware) stored on one or more nontransitory computer- or processor-readable media. The motion planning graph toolkit provides an intuitive user interface, for example an intuitive graphical user interface (GUI). The application allows an end user to interact with a digital or virtual model of a robot and a digital or virtual representation of an operational environment (interchangeably referred to herein as a work cell) in which the robot will operate, to generate or create motion planning graphs or road maps or lattices that have been kinematic-checked and collision-checked with respect to objects (e.g., static objects) with known positions. Kinematics checking may include determining whether a robot can be in or move to a defined state or pose, for example based on a physical geometry or design or the robot (e.g., number of joints, location of joints, degrees of freedom, length of appendages). Collision checking may include determining whether a robot can be in or move to a defined state or pose without colliding, for example without colliding with a static object in the environment.

A system or application may present a user interface (e.g., graphical user interface) that allows specification of origin or "seed" poses. Such may advantageously provide a presentation window in which a representation of an environment with a robot and obstacles is presented. The user interface can provide tools to allow the origin or seed poses to be visually specified, and can represent a current pose, future pose, or even past pose of a robot.

The system or application may autonomously generate a number of additional poses for example neighboring poses or poses in a same region, the origin poses and the additional or neighboring poses forming a group of poses; and autonomously generate a number of edges, each edge identifying a transition between a respective pair of the poses of the group of poses which include the origin poses and the additional or neighboring poses.

The system or application may autonomously perform kinematic checking, for example identifying self-collisions of the robot or impossible poses for the robot.

The system or application may autonomously perform collision checking of each of the poses. The system or application may autonomously perform collision checking of each transition between respective pairs of the poses.

The system or application may autonomously eliminate any poses from the group of poses where a robot is in self collision or is in collision with an object in a workspace.

A method of operation in a processor-based system to provide a user interface, may be summarized as including: providing at least one user interface element that allows visual specification of one or more origin or seed poses; receiving a specification of one or more origin or seed poses; autonomously generating a number of additional poses for example neighboring poses or poses in a same region, the origin poses and the additional or neighboring poses forming a group of poses; and autonomously generating a number of edges, each edge identifying a transition between a respective pair of the poses of the group of poses which include the origin poses and the additional or neighboring poses.

The method may further include autonomously performing kinematic checking by the processor-based system. Autonomously performing kinematic checking may include autonomously performing kinematic checking of the autonomously generated additional poses by the processor-based system based on a geometry of a robot.

The method may further include autonomously performing collision checking of each of the poses.

The method may further include autonomously performing collision checking of each transition between respective pairs of the poses.

The method may further include autonomously eliminating, by the processor-based system, any poses from the group of poses where a robot is in self collision or is in collision with an object in a workspace.

While implementations and examples are generally described herein in terms of robots with moveable appendages and end effectors, the various structures, process and techniques described here can be applied to other robots, including for instance autonomous vehicles. Unless expressly specified otherwise, references to robots herein include robots with moveable appendages as well as robots in the form of autonomous vehicles. While implementations and examples are generally described herein in terms of the Realtime Robotic Motion Planning Accelerator (MPA) other motions planners can employ the motion planning graphs, roadmaps or lattices generally described herein.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
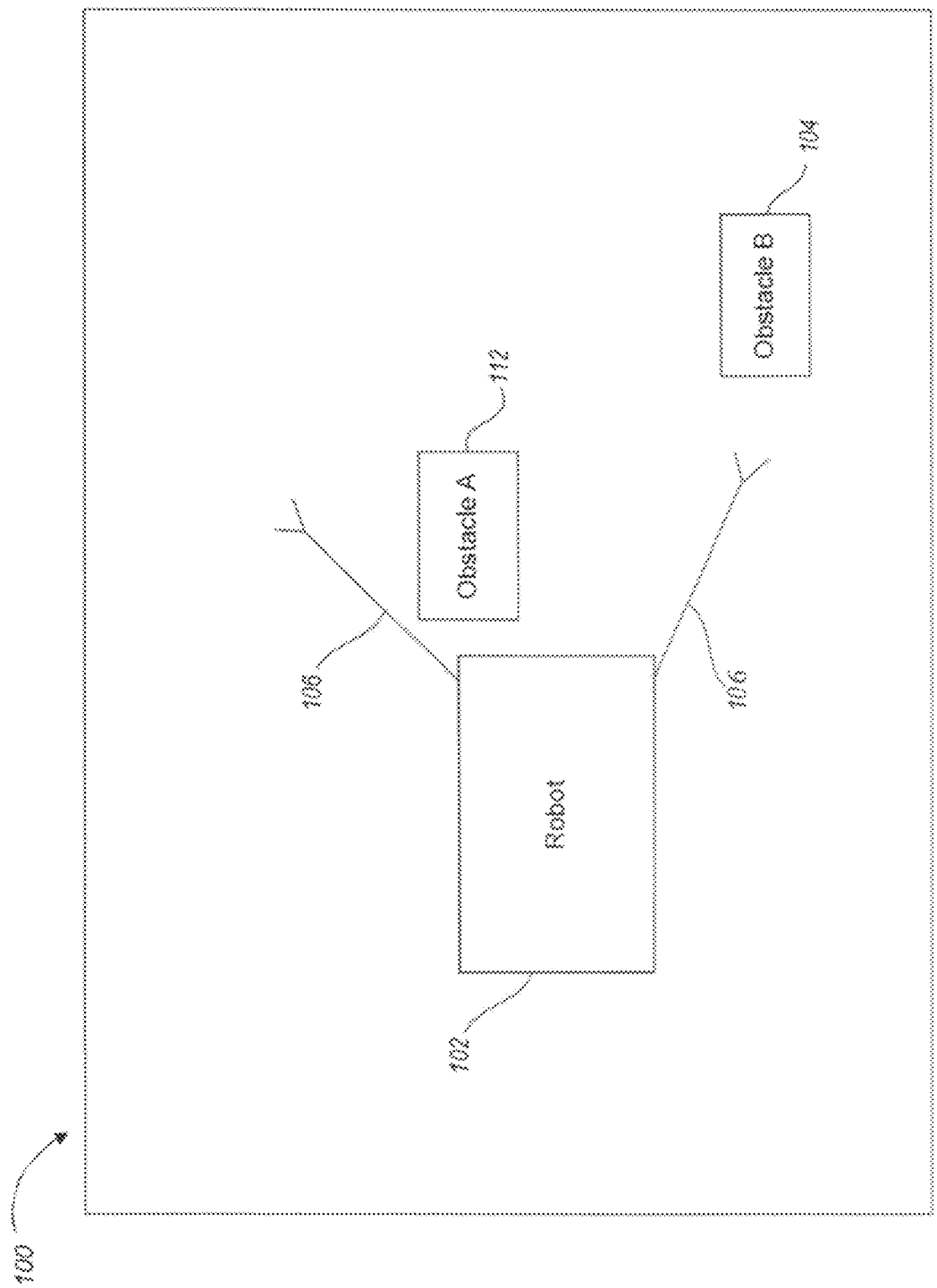
FIG. 1 is a schematic view of an environment in which a robot may operate, according to one illustrated implementation.

FIG. 1 shows an operational environment 100 in which a robot 102 may operate, according to one illustrated embodiment. For the sake of brevity, the operational environment 100 is referred to herein as the environment 100. The environment represents a two-dimensional or three-dimensional space in which the robot 102 may operate and move. The robot 102 may be any type of robot, including, but not limited to: Cartesian, selectively compliant arm for robotic assembly (SCARA), cylindrical, delta, polar and vertically articulated. The robot may also be an automobile, airplane, drone, or any other vehicle that can operate autonomously or semi-autonomously (i.e., at least partially autonomously) and move in the space represented by the environment 100. The environment 100 is the two- or three-dimensional space in which the robot operates and is different than the robot's "configuration space" (often called "C-space") referenced below with respect to the motion planning graphs of FIGS. 4A and 4B and as explained in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," which is hereby incorporated by reference in its entirety; and in International Patent Application Publication No. WO 2016/122840, filed Jan. 5, 2016, entitled "SPECIALIZED ROBOT MOTION PLANNING HARDWARE AND METHODS OF MAKING AND USING SAME," which is also hereby incorporated by reference in its entirety. The configuration space is typically many dimensional (i.e., greater than 3 dimensions). In particular, each node of the planning graph represents a state of the robot which may include, but is not limited to, a particular configuration of the robot (which is the complete specification of a particular set of joint positions of the robot), pose, velocity and heading of the robot. Each edge of the planning graph represents a transition of the robot from one state to another state.

Referring to FIG. 1, the environment 100 can include obstacle collision regions. These obstacle collision regions may be due to static objects (e.g., bins, containers, pillars, shelves, buildings, trees, rocks, furniture) or dynamic objects (e.g., other robots, vehicles, people) in the environment 100. For example, obstacle A 112 and obstacle B 104 represent objects that create collision regions in the environment 100 such that it is possible for robot 102 to collide with obstacle A 112 or obstacle B 104 if robot 102 attempts to occupy the same space within the environment 100 at the same time as either obstacle A 112 or obstacle B 104. In various embodiments, there may be fewer or additional objects than that shown in FIG. 1.

Additionally, there are commonly kinematic constraints placed on movement or poses of the robot based on the geometry of the robot itself, as well as the number, the locations and the degrees of freedom of movement of the robot.

Challenges to motion planning involve the ability to perform motion planning at a relatively low cost, but at very fast speeds. Involved with this are challenges to efficiently represent, communicate and compare the space considered to be occupied by the robot 102 and the obstacles in the environment 100. For example, as shown in FIG. 1, obstacle A 112 is currently in front of robot 102. It is advantageous for robot 102 to be able to quickly and efficiently determine which movements of robot arm 106 (and any movement of robot 102) would result in a collision with obstacle A 112. Therefore, the present disclosure provides solutions that generate motion planning graphs, roadmaps or lattices to allow motion planning for robots 102, including autonomous vehicles, operating in an environment 100 occupied by robot 102 and one or more obstacles A 112. In particular, an end user may specify one or more poses, and a system or application may advantageously automatically or autonomously determine one or more autonomously generated additional poses, and edges between the poses. The system or application may advantageously automatically or autonomously perform kinematic checking and collision checking of the poses and edges.

While FIG. 1 illustrates a representative environment 100, typical environments may include many additional objects and entities, including objects that correspond to other robots and various other natural or artificial static and dynamic objects and obstacles. The concepts taught herein may be employed in a similar fashion with a more populated environment than that illustrated.

Figure 2:
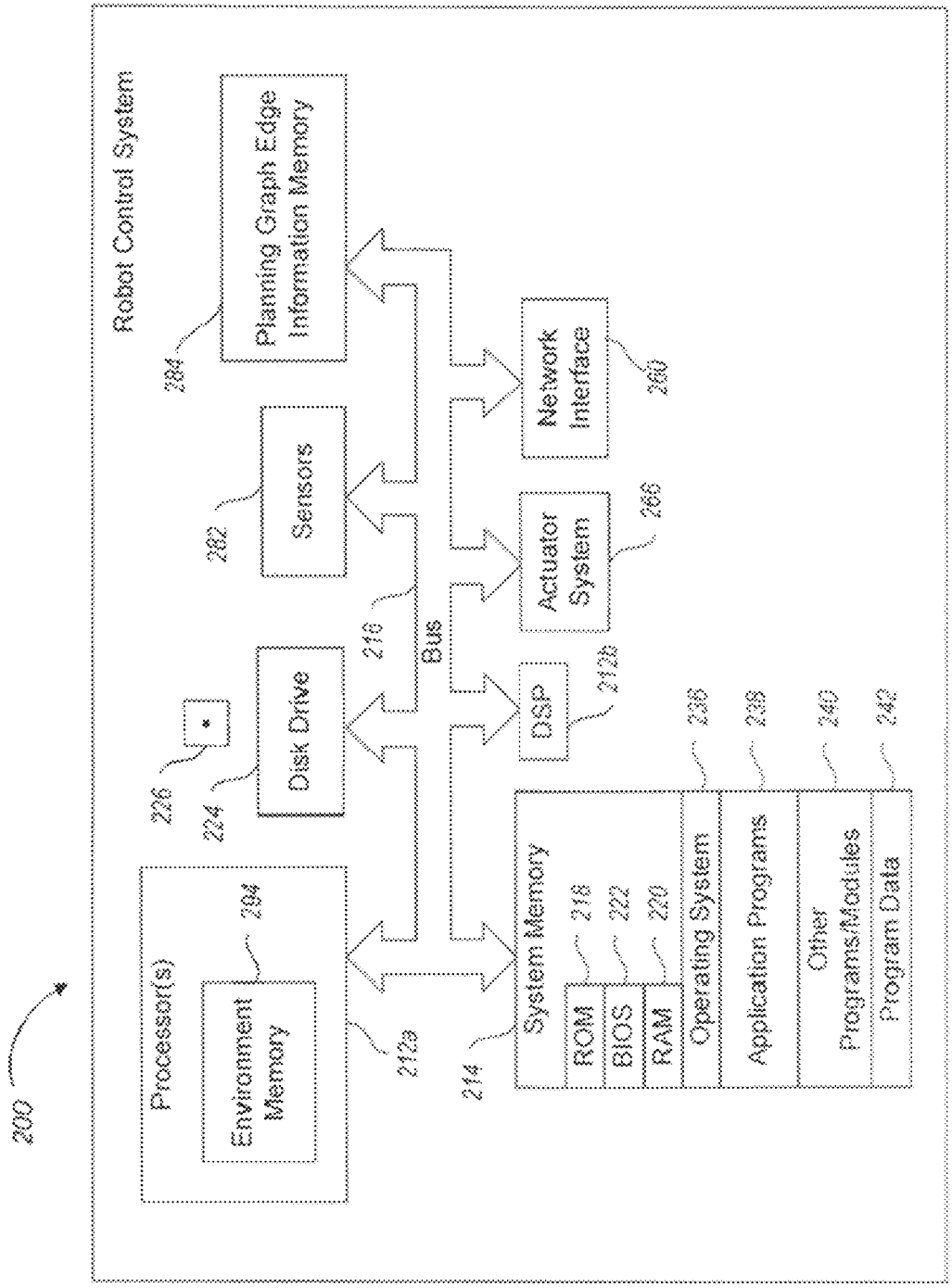
FIG. 2 is a functional block diagram of a processor-based system according to one illustrated implementation, that, at least in part, is operable to generate motion planning graphs useful in motion planning for robot that may operate in the environment of FIG. 1.

FIG. 2 and the following discussion provide a brief, general description of a suitable processor-based system 200 in which various illustrated and described motion planning systems and methods might be implemented, according to one illustrated embodiment.

Although not required, many of the embodiments will be described in the general context of computer-executable instructions, such as program application modules, objects, or macros stored on computer- or processor-readable media and executed by one or more computer or processors that can perform collision assessments and motion planning operations. Such motion planning operations may include, but are not limited to, one or more of: generating one or more discretized representations of robot swept volumes associated with edges of planning graphs; determining which of a number of discretizations to use to generate discretized representations of robot sweep volumes; generating discretized representations of the environment in which the robot 102 will operate, including obstacles in the environment; determining which of a number of discretizations to use to generate a discretized representation of the environment; determining a plurality of planning graphs; storing the determined plurality of planning graphs and respective sets of edge information; generating information that represents a volume swept by at least a portion of the robot 102 in transitioning between the states represented by the nodes of the planning graphs; performing a collision assessment on edges of a planning graph; providing sets of edge information for the planning graphs; identifying one or more optimized results from planning graphs; collision checking for collisions between discretized representations of swept volumes associated with edges of planning graphs and discretized representations of obstacles in the environment in which the robot 102 will operate; determining whether the optimization produces any collision-free paths for the robot 102; and implementing a motion plan for the robot 102.

The robot 102 of FIG. 1 has sensors, such as sensors 282 shown in FIG. 2, which send perception data to one or more processors, such as processor 212a. The perception data can be provided as a stream of which voxels or boxes or other representations are occupied in the current environment. This data is generated by (or provided to) one or more processors, such as processor 212a, in the form of an occupancy grid or other digital representation. In particular, when representing either a robot or an object in the environment 100 (e.g., an obstacle), one may represent their surfaces as either voxels (3D pixels) or meshes of polygons (often triangles). Each discretized region of space is termed a "voxel," equivalent to a 3D (volumetric) pixel. In some cases, it is advantageous to represent the objects instead as boxes (rectangular prisms). Due to the fact that objects are not randomly shaped, there may be a significant amount of structure in how the voxels are organized; many voxels in an object are immediately next to each other in 3D space. Thus, representing objects as boxes may require far fewer bits (i.e., may require just the x, y, z Cartesian coordinates for two opposite corners of the box). Also, doing intersection tests for boxes is comparable in complexity to doing so for voxels.

Many embodiments may combine the outputs of multiple sensors and the sensors may provide a very fine granularity voxelization. However, in order for the robot 102 to efficiently perform motion planning, the processor 212a of the robot 102 may use coarser voxels (i.e., "processor voxels") to represent the environment and the volume in 3D space swept by the robot 102 when making transitions between various states. Thus, the system 200 may transform the output of the sensors 282 accordingly. For example, the output of the sensors 282 may use 10 bits of precision on each axis, so each voxel originating directly from the sensors 282 (i.e., a "sensor voxel") has a 30-bit ID, and there are $2^{30}$ sensor voxels. The system 200 uses (at design time and runtime) 6 bits of precision on each axis for an 18-bit processor voxel ID, and there are $2^{18}$ processor voxels. Thus there are $2^{12}$ sensor voxels per processor voxel. At runtime, if the system 200 determines any of the sensor voxels within a processor voxel is occupied, the system 200 considers the processor voxel to be occupied and generates the occupancy grid or other representation accordingly.

Each edge of a planning graph for the robot 102 also has some number of voxels (or boxes) corresponding to the volume in 3D space swept by the robot 102 when making the transition in the planning graph from one state to another state represented by that edge. Those voxels or boxes swept by the robot 102 when making the transition in the planning graph from one state to another state represented by that edge may be stored for each edge of the planning graph in off-chip memory devoted to the planning graph, such as in planning graph edge information memory 284. In various other embodiments, the voxels or boxes swept by the robot 102 when making the transition in the planning graph from one state to another state represented by that edge may be stored for each edge of the planning graph in other locations, such as in on-chip memory in one or more application specific integrated circuits (ASIC), for example.

In one embodiment, the collision assessment is performed by first streaming in all of the obstacle voxels (or boxes) onto a processor, such as processor 212a. For example, the obstacle voxels (or boxes) representing environment 100, including obstacle A 112 and obstacle B 104, may be streamed into processor 212a and stored on environment memory 294. The environment memory 294 is on-chip memory of processor 212a. In some embodiments, the environment memory 294 may be block RAM (BRAM) in a field programmable gate array (FPGA). In some embodiments, the BRAM may be a dedicated, configurable two-port memory unit containing several kilobits of random access memory (RAM). The FPGA contains several of these blocks. Then the edge information for each edge of the planning graph for the robot 102 is streamed from the off-chip memory devoted to the planning graph, such as from planning graph edge information memory 284. For each edge voxel (or box), when it is streamed in from the swept volume of an edge, if it collides with any of the obstacle voxels (or boxes), the processor 212a determines a collision with that edge in the planning graph.

For example, when an edge voxel is streamed in from the swept volume of edge x of the planning graph, the processor 212a may use Boolean circuitry to compare the edge voxel with all of the obstacle voxels (or boxes) stored on environment memory 294. If the system 200 determines the edge voxel collides with any of the obstacle voxels (or boxes) based on the comparison, the system 200 notes a collision with edge x. This embodiment improves on the technology of collision assessment because it enables much larger planning graphs to be used in the collision assessment as compared to other designs in which the collision assessment is performed in parallel on all the edges of the planning graph. In particular, this helps overcome the disadvantage of other designs with respect to a limited amount of planning graph information that could be stored on processor chip circuitry. Using the collision assessment method described herein, on-chip storage, such as environment memory 294, is often more than sufficient for storing all the obstacle boxes (although it may be less so with using voxels). This provides the ability to store large planning graphs and/or multiple planning graphs in less expensive, off-chip storage. For example, this provides the ability to store large planning graphs and/or multiple planning graphs in planning graph edge information memory 284 which, in some embodiments, is a less expensive type of memory, such as dynamic random access memory (DRAM).

In various embodiments, such operations may be performed entirely in hardware circuitry or as software stored in a memory storage, such as system memory 214, and executed by one or more hardware processors 212a, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EE-PROMs), or as a combination of hardware circuitry and software stored in the memory storage.

Also, implementation of various relevant aspects of perception, planning graph construction, collision detection, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME" and U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS" and are incorporated herein by reference, in their entirety. Those skilled in the relevant art will appreciate that the illustrated embodiments, as well as other embodiments, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The embodiments or portions thereof (e.g., at design time and pre-runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve motion planning.

For example, various motion planning solutions "bake in" a roadmap (i.e., a planning graph) into the processor, and each edge in the roadmap corresponds to a non-reconfigurable Boolean circuit of the processor. The design in which the planning graph is "baked in" to the processor, poses a problem of having limited processor circuitry to store multiple or large planning graphs.

One solution provides a reconfigurable design that places the planning graph information into memory storage. With such a solution, once again there is information for each edge of the planning graph, but this information is stored in memory instead of being baked into a circuit. Each edge corresponds to a motion of the robot 102, and each motion sweeps a volume in 3D space. This swept volume collides with some number of obstacle voxels (or boxes, or however it may be decided to represent obstacles in various embodiments). With such a solution, the voxels that this edge collides with is the information that is stored in memory.

In some implementations, the system or application may provide for dynamically switching between multiple planning graphs at runtime (i.e., reconfiguring the processor). For example, consider a robot with an end effector that can grasp objects. The robot arm collides with different parts of 3D space when holding something than when not holding something. One example is the robot arm 106 holding a big ball at the end of the arm with the end effector. The planning graph corresponding to when the robot 102 is "holding nothing" doesn't work if the robot 102 is holding something. Conversely, one could very conservatively use the "holding something" planning graph even if the robot 102 isn't holding anything, but that is both inefficient and would require the use of a single planning graph corresponding to the scenario in which the robot 102 is holding the largest possible object. Instead, in various embodiments, the system 200 builds a family of planning graphs corresponding to different possible characteristics, e.g., "holding nothing", "holding a small sphere of size x", "holding a rectangular prism of size y", etc. These planning graphs may be swapped in and out from the planning graph edge information memory 284 by the processor 212*a* as the robot 102 picks things up and puts them down. This solution also applies to a robot whose end effector changes at times. For example, the robot 102 may be in an arrangement having a first end effector with a first set of dimensions. This first end effector may be swapped for a second end effector with a second set of dimensions. When the first end effector is swapped for a second end effector with a second set of dimensions the robot 102 will be in a different arrangement having the second end effector. Where the dimensions of the second set of dimensions are different from the dimensions of the first set of dimensions, the volume swept by the robot changes when the end effectors are swapped. Also for example, where the robot is an autonomous or partially autonomous vehicle, the vehicle may have a first set of dimensions in a first arrangement during a first period and the same vehicle may have a second set of dimensions in a second arrangement during a second period. For instance, a vehicle may be empty in a first arrangement and fully loaded in a second arrangement, changing the weight of the vehicle and potentially changing a height of the vehicle above a road, a clearance under the vehicle, or even a trajectory of a vehicle, for instance as it corners around a turn or curve. Where the dimensions of the second set of dimensions are different from the dimensions of the first set of dimensions, the volume swept by the vehicle changes between the first and the second arrangements. Likewise, where the trajectory changes between the first and the second arrangements the volume swept by the vehicle changes between the arrangements. The system 200 thus stores different planning graphs in planning graph edge information memory 284 for different end effectors.

Planning graphs can be generated in advance, for example, during a configuration time prior to runtime. Once the planning graphs are generated, they may all be stored in planning graph edge information memory 284 and it is relatively quick and efficient for the processor 212*a* to swap them in and out, or select which one to use based on the current characteristic of the robot 102, such as when the robot is grasping an object of a particular size.

As noted above, some pre-processing activities may be performed before runtime and thus, in some embodiments, these operations may be performed by remote processing devices, which are linked through a communications network to the processor-based system 200 via network interface 260. For example, a programming phase allows preparation of the robot for the problem of interest. In such embodiments, extensive preprocessing is leveraged to avoid runtime computation. Precomputed data regarding the volume in 3D space swept by the robot 102 when making the transition in the planning graph from one state to another state represented by edges in the roadmap may be stored in planning graph edge information memory 284 and accessed by the processor 212*a* during runtime. The system 200 may also build a family of planning graphs prior to runtime corresponding to different possible changing dimensional characteristics of the robot that may occur during runtime. The system 200 then stores such planning graphs in planning graph edge information memory 284.

During the runtime phase, the sensors 282 send perception data to processor 212*a*. The perception data may be a stream of which voxels or boxes that are present in the current environment and are stored in on-chip environment memory 294. Using Boolean circuitry to compare the perception data retrieved from the environment memory 294 to the information stored in the planning graph edge information memory 284, the processor 212*a* calculates which motions avoid collision and selects a corresponding path in the planning graph for the robot 102 to follow. The processor 212*a* then runs and returns the resulting path to the actuator system 266.

FIG. 2 shows a processor-based system 200, such as that for robot 102, comprising one or more processor(s), represented by processor 212*a*, and one or more associated nontransitory machine-readable storage media, such as system memory 214, planning graph edge information memory 284 and computer-readable media 226 associated with disk drive 224. The associated nontransitory computer- or processor-readable storage media, including system memory 214, planning graph edge information memory 284 and computer-readable media 226 associated with disk drive 224, are communicatively coupled to the processor 212*a* via one or more communications channels, such as system bus 216. The system bus 216 can employ any known bus structures or architectures, including a memory bus with memory controller, a peripheral bus, and/or a local bus. One or more sensors 282 and an actuator system 266 are also communicatively coupled to the processor 212*a* via system bus 216. One or more of such components may also or instead be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The processor-based system 200 may also be communicably coupled to remote systems, e.g., desktop computer, laptop computer, ultraportable computer, tablet computer, smartphone, wearable computer (not shown) that are directly communicably coupled or indirectly communicably coupled to the various components of the processor-based system 200 via the network interface 260. Such remote systems may be used to program, configure, control or otherwise interface with or input data to the processor-based system 200 and various components within the processor-based system 200. Such a connection may be through one or more communications channels, for example, one or more wide area networks (WANs), for instance, the Internet, using Internet protocols. As noted above, pre-runtime calculations (e.g., generation of the family of planning graphs) may be performed by a system that is separate from the robot 102 or other robot, while runtime calculations may be performed on the processor 212 that is on the robot 102 since it is important for the system 200 to be able to change planning graphs to react in real time to changing physical dimensions of the robot 102.

Unless described otherwise, the construction and operation of the various blocks shown in FIG. 2 are of conventional design or are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; and/or U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS" and are incorporated herein by reference, in their entirety. As a result, such blocks need not be described in further detail, as they will be understood by those skilled in the relevant art in view of the references incorporated by reference herein.

The processor-based system 200 may include one or more processing units 212, the system memory 214, the planning graph edge information memory 284 and the system bus 216 that couples various system components including the system memory 214 and the planning graph edge information memory 284 to the processing units 212. In some embodiments, the planning graph edge information memory 284 may be, or be part of, the system memory 214. The processing units may be any logic processing unit, such as one or more central processing units (CPUs) 212a, digital signal processors (DSPs) 212b, application-specific integrated circuits (ASICs), field programmable gate arrays (FPGAs), etc. The system memory 214 may include read-only memory ("ROM") 218 and random access memory ("RAM") 220. The planning graph edge information memory 284 may include RAM, such as DRAM. A basic input/output system ("BIOS") 222, which can form part of the ROM 218, contains basic routines that help transfer information between elements within the processor-based system 200, such as during start-up.

The processor-based system 200 may include a disk drive 224, which may be, for example, a hard disk drive for reading from and writing to a hard disk, a flash memory drive for reading from and writing to removable flash memory devices, an optical disk drive for reading from and writing to removable optical disks, or a magnetic disk drive for reading from and writing to magnetic disks. The processor-based system 200 may also include any combination of such disk drives in various different embodiments. The disk drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the processor-based system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to perform one or more of: generating one or more discretized representations of robot swept volumes associated with edges of planning graphs; determining which of a number of discretizations to use to generate discretized representations of robot swept volumes; generating discretized representations of the environment 100 in which the robot will operate, including obstacles in the environment 100; determining which of a number of discretizations to use to generate a discretized representation of the environment 100; determining a plurality of planning graphs; storing the determined plurality of planning graphs and respective sets of edge information; generating information that represents a volume swept by at least a portion of the robot in transitioning between the states represented by the nodes of the planning graphs; performing a collision assessment on edges of a planning graph; providing sets of edge information for the planning graphs; identifying one or more optimized results from planning graphs; collision checking for collisions between discretized representations of swept volumes associated with edges of planning graphs and discretized representations of obstacles in the environment 100 in which the robot 102 will operate; determining whether the optimization produces any collision-free paths for the robot; and implementing a motion plan for the robot. Application programs 238 may additionally include one or more machine-readable instructions that cause the processor(s) 212 to perform other operations of perception (via sensors 282), planning graph construction, collision detection, and path search as described herein and in the references incorporated herein by reference.

Application programs 238 may additionally include one or more machine-readable instructions that cause the processor(s) 212 to generate respective sets of planning graph edge information that represent different volumes swept by the robot 102 in transitioning between states corresponding to when the robot 102 has different dimensions and store a plurality of planning graphs in planning graph edge information memory 284 corresponding to the respective sets of planning graph edge information.

Application programs 238 may additionally include one or more machine-readable instructions that cause the processor(s) 212 to, for a first discretized representation of an environment 100 in which the robot 102 will operate, supply and store in environment memory 294 at least a portion of the first discretized representation of the environment 100; for each edge of the planning graph, provide and store a respective set of edge information in planning graph edge information memory 284; and identify any of the edges of the planning graph that the corresponding transition would result in a collision between at least a portion of the robot 102 and at least a portion of at least one of the one or more obstacles, such as obstacle A 112 and obstacle B 104 in the environment 100.

The term "environment" is used in the present example to refer to the robot's current workspace, including obstacles. The term "task" is used in the present example to refer to a robot task in which the robot 102 must get from Pose A to Pose B (perhaps grasping or dropping something) without colliding with obstacles in its environment. The term "scenario" is used in the present example to refer to a class of environment/task pairs. For example, a scenario could be "pick-and-place tasks in an environment with a 3-foot table and between x and y obstacles with sizes and shapes in a given range." There may be many different task/environment pairs that fit into such criteria, depending on the locations of goals and the sizes and shapes of obstacles. The system 200 may include one or more remote processing devices, which are linked through a communications network via network interface 260. Such one or more remote processing devices may execute one or more machine-readable instructions that cause the system 200 to generate a respective discretization of a representation of an environment 100 in which the robot 102 will operate for pairs of tasks and environments of various different scenarios. In an example embodiment, at least two of the respective discretizations comprise a respective set of voxels. The voxels of the respective discretizations may be non-homogenous in at least one of size and shape within the respective discretization. Also, a respective distribution of the non-homogeneousness of the voxels of the respective discretizations may be different from one another. In particular, the discretizations may comprise a respective set of voxels, where the voxels of at least two of the respective discretizations are non-homogenous in at least one of size and shape within the respective discretization, and a respective distribution of the non-homogeneousness of the voxels of at least two of the respective discretizations is different from one another. The Application programs 238 may include one or more machine-readable instructions that cause the processor(s) 212 to then assess an effectiveness of the generated respective discretizations of the representation of the environment 100 in which the robot will operate and store the generated respective discretizations that are assessed to be the most effective for particular scenarios.

Application programs 238 may additionally include one or more machine-readable instructions that cause the processor(s) 212 to, based at on an identified scenario that classifies a pair of tasks which the robot 102 will perform and the environment 100 in which the robot will operate, determine which of a number of discretizations to use to generate a number of swept volumes that represent respective regions through which the robot 102 will pass when transitioning between one state of the robot and another state of the robot 102; and for each of a plurality of edges in a planning graph, determine a respective swept volume of the edge using the determined discretization. The application programs 238 may additionally include one or more machine-readable instructions that cause the processor(s) 212 to store the determined swept volume's respective discretizations of the representation of the environment 100 in which the robot 102 will operate that is assessed to be the most effective for the identified scenario.

Application programs 238 may additionally include one or more machine-readable instructions that cause the processor(s) 212 to, based at least in part on an identified scenario that classifies a pair of tasks which the robot 102 will perform and an environment 100 in which the robot operates, determine which of a number of discretizations to use to generate a discretized representation of the environment 100. Application programs 238 may additionally include one or more machine-readable instructions that cause the processor(s) 212 to receive sensor information produced by one or more sensors 282 that sense the environment 100 and generate a discretized representation of the environment, including obstacles, if any, in the environment using the determined discretization. A plurality of voxels of the determined discretization may be non-homogenous in at least one of size and shape within the respective discretization, and a respective distribution of the non-homogeneousness of the voxels of the determined discretization may be different from that of another one of the number of discretizations.

Application programs 238 may additionally include one or more machine-readable instructions that cause the processor(s) 212 to perform collision checking for multiple planning graphs between edges of the planning graphs and any obstacles in an environment in which the robot will operate. The processor(s) 212 may perform such collision checking on each planning graph, temporarily update the planning graph accordingly, and perform an optimization and determine whether the optimized results, if any, from the updated planning graph meet a satisfaction condition. If the satisfaction condition is not met, then the processor(s) 212 may move to the next planning graph and perform the same operation. Once a planning graph is found in which the satisfaction condition is met, the processor(s) 212 apply a transition identified by one of the optimized results from the planning graph which met the satisfaction condition to the robot 102.

Figure 5:
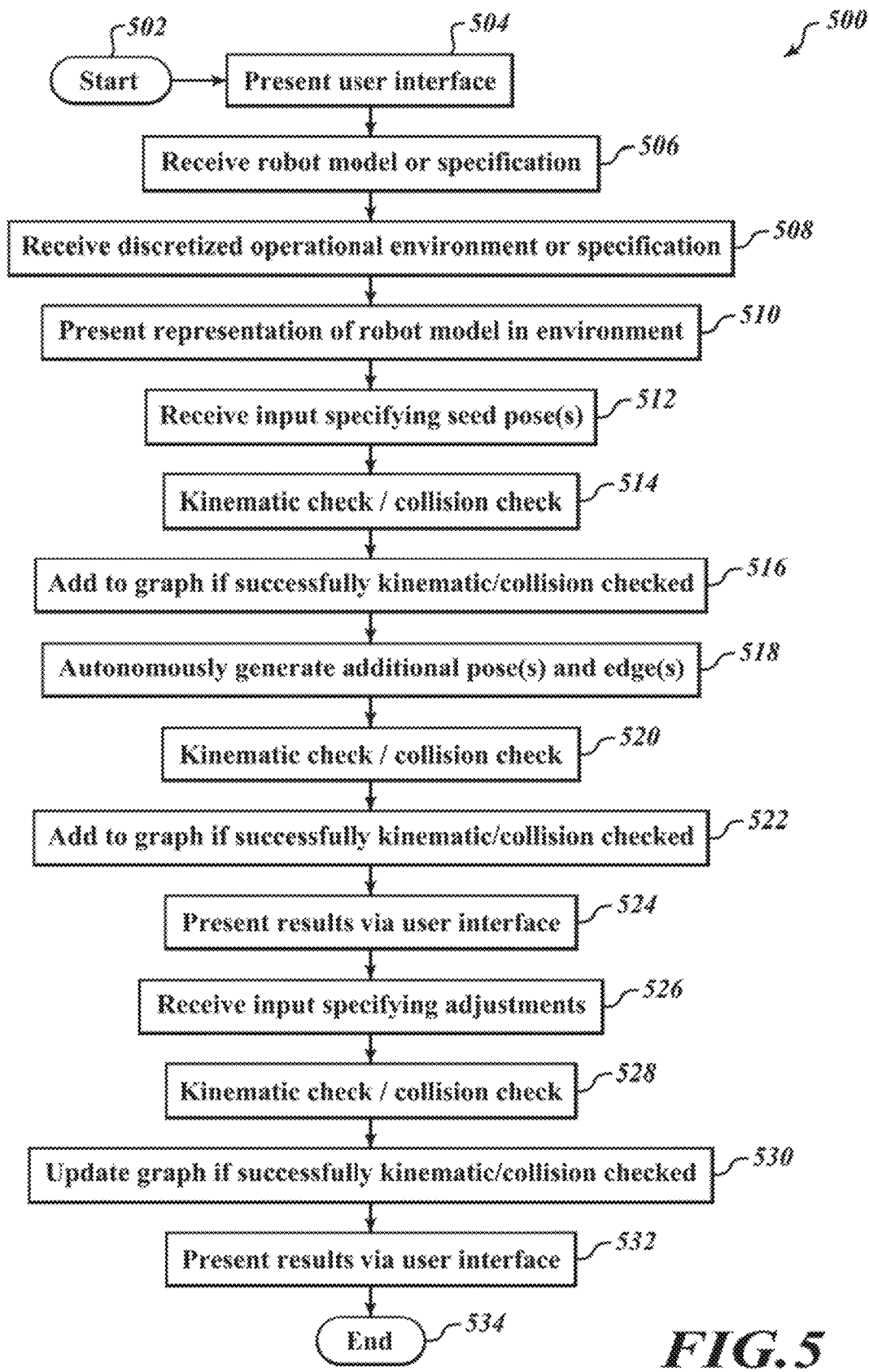
FIG. 5 is a flow diagram showing a method of operation in a processor-based system, according to one illustrated embodiment.
Figure 6:
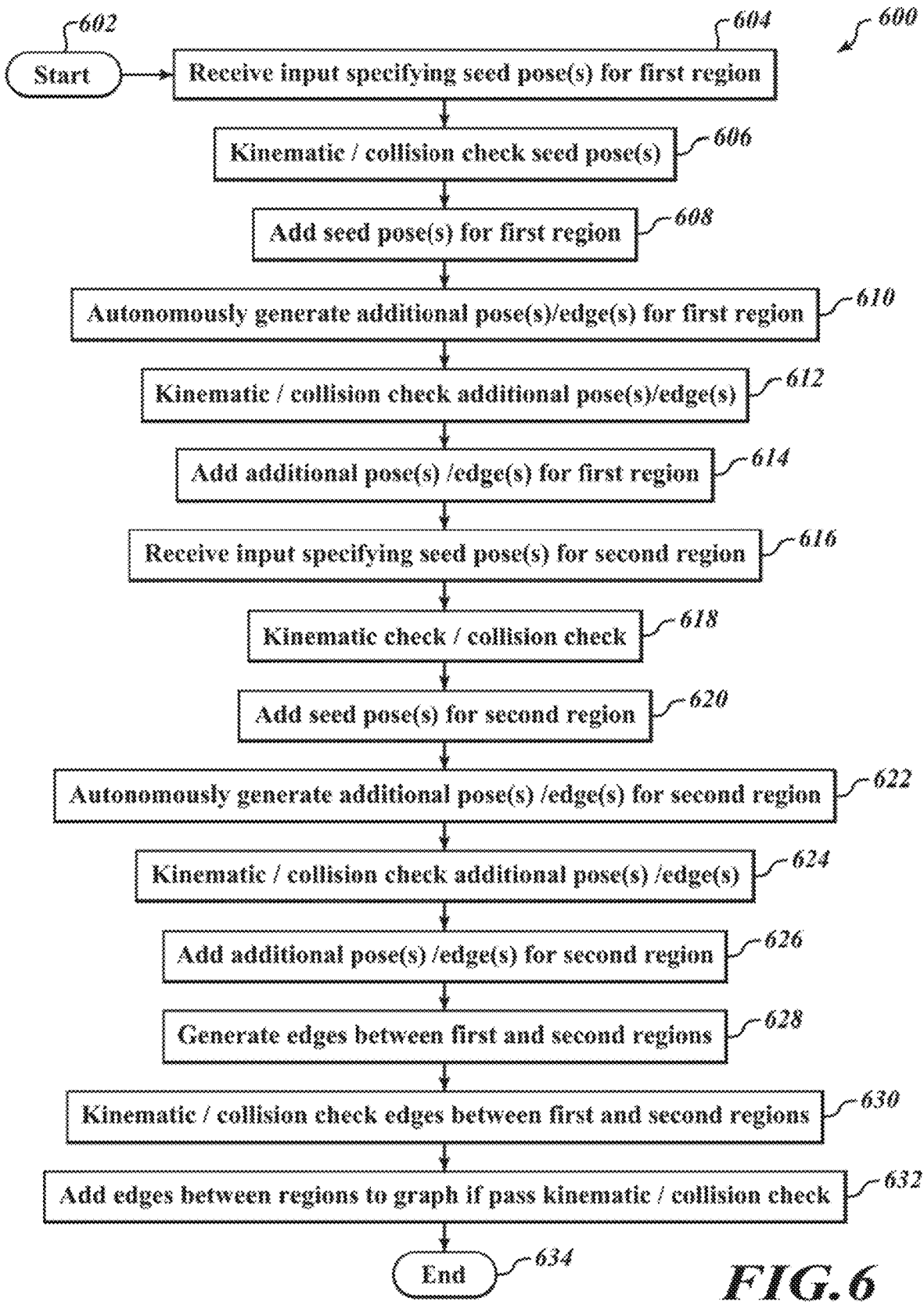
FIG. 6 is a flow diagram showing a method of operation in a processor-based system, according to one illustrated embodiment, which may be employed in executing the method illustrated in FIG. 5.

Application programs 238 may additionally include one or more machine-readable instructions that cause the processor(s) 212 to perform various other methods described herein, including, but not limited to, those illustrated in FIGS. 5 and 6.

In various embodiments, one or more of the operations described above may be performed by one or more remote processing devices of the system 200, which are linked through a communications network via network interface 260 or by one or more processor(s) 212 that are located on the robot 102.

While shown in FIG. 2 as being stored in the system memory 214, the operating system 236, application programs 238, other programs/modules 240, and program data 242 can be stored on associated computer-readable media 226 of the disk drive 224.

The processor(s) 212 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A. Unless described otherwise, the construction and operation of the various blocks shown in FIG. 2 are of conventional design. As a result, such blocks need not be described in further detail herein, as they will be understood by those skilled in the relevant art.

Thus, to facilitate avoiding collisions, at design time (prior to runtime), one or more planning graphs are generated by the system 200 to determine which areas are occupied by the robot 102 when making various transitions from one state to another state. For example, an edge of a planning graph for the robot 102 has some number of voxels (or boxes) corresponding to the volume in 3D space swept by the robot 102 corresponding to region 302. Those voxels or boxes swept by the robot 102 corresponding to a region when making the corresponding transition in the planning graph may be stored as corresponding to an edge of the planning graph in off-chip memory devoted to the planning graph, such as in planning graph edge information memory 284. Then, at runtime, the obstacle voxels (or boxes) representing environment 100, including obstacle A 112 (and also obstacle B 104) are provided (e.g., streamed into) to processor 212a in the form of an occupancy grid or other representation and stored on the on-chip environment memory 294. The system 200 determines which voxels are occupied (based on the occupancy grid or other representation), and determines to not use any motion that would collide with any currently occupied voxel. In particular, for each edge voxel (or box) representing a portion of the swept volume of an edge, when it is streamed in from planning graph edge information memory 284, the processor determines whether it collides with any of the obstacle voxels (or boxes) that have been stored in environment memory 294 based on the occupancy grid or other representation. If the edge voxel (or box) collides with any of the obstacle voxels (or boxes), the system 200 determines a collision with that edge in the planning graph and will determine to not use the motion of the robot 102 associated with that edge in the planning graph.

For example, prior to executing the motion of the robot arm 106 depicted in FIG. 1, the system 200 would start to stream in the edge voxels (or boxes) of all the edges of the applicable planning graph from planning graph edge memory 284. For each edge, as the processor 212a encounters each edge voxel (or box), it would check to see if any edge voxel (or box) collides with any of the obstacle voxels (or boxes) stored in environment memory 294 (including those for obstacle A 112). Any edge voxel (or box) within the swept region would result in such a collision because obstacle voxels (or boxes) of obstacle A 112 stored in environment memory 294 occupy that same region according to the occupancy grid or other representation. As soon as the processor 212a encounters an edge voxel (or box) that collides with any of the obstacle voxels (or boxes), the processor 212a then determines to not use that edge of the planning graph. Once finished processing the edges of the planning graph, the processor 212a determines a path within the planning graph that would cause the robot to move from the initial position to the goal position using the remaining edges that have not been determined to collide with the obstacle voxels (or boxes) stored in environment memory 294.

The system 200 may also make decisions regarding how to represent the swept volume represented by each of the planning graphs as well as how to represent the obstacles in the environment 100. Such decisions may include decisions made by the processor 212a regarding how the discretization is to be performed, such as, for example, whether to represent the swept volume with voxels or boxes, the shape and size of the voxels or boxes to use, whether to use a discretization that is non-uniform in size and/or shape of the voxels or boxes used, and in which scenarios to use different shapes and/or sizes of voxels or boxes. In various embodiments, one or more of such operations described above to make decisions regarding how to represent the swept volume represented by each of the planning graphs as well as how to represent the obstacles in the environment 100 may be performed by one or more remote processing devices of the system 200, which are linked through a communications network via network interface 260 or by one or more processor(s) 212 that are located on the robot 102.

In particular, the system 200 may decide that the working space of the robot 102 will be discretized into voxels (which may later be grouped into boxes). One example implementation performs uniform quantization in each of the 3 dimensions. However, it may be advantageous to have non-cube-shaped voxels and/or voxels that are smaller/larger in different parts of the robot's workspace. For example, one embodiment uses smaller voxels (finer resolution) in the space right in front of the robot 102 and larger voxels (coarser resolution) at the extreme end of the robot's reach. Thus, various embodiments may use non-uniform quantization and/or use of non-cube-shaped voxels. The present disclosure also provides an algorithm for how the system 200 chooses the voxel sizes and/or shapes.

One example embodiment uses a training algorithm for execution prior to runtime to determine which voxel sizes and shapes may be better to use for various different scenarios. The system 200 may be trained by using a given or generated large set of task/environment pairs from one or more scenarios. The system 200 then chooses the discretization that is assessed to be most effective over the large set of training samples.

For example, for any given environment/task pair, there is an optimal discretization (or multiple discretizations that are equally optimal). The system 200 may test/train on T environment/task pairs, where T is a large number, and then record the optimal discretization for each. This may result in many different discretizations, each of which is optimal for only one or a small number of environment/task pairs. After testing all T environment/task pairs, the system selects the discretization that is assessed to be most effective over the whole set of samples. This approach would also involve trying every possible discretization on every possible environment/task pair, which would be intractable.

To overcome the above problem, the system 200 performs training like that explained above, except that the system 200 considers a finite number of possible discretizations, G. For each environment/task pair, the system records which of the G discretizations provided is assessed to be most effective. After processing all T environment/task pairs, the system 200 selects the discretization that is assessed to be most effective in the most environment/task pairs.

As an example, the robot 102 may be facing a box of space in front of it. The system may determine to discretize the space such that 6-bits are used to describe the position in each dimension (i.e., there are $2^6$ possible positions on each axis). This results in $2^{18}$ voxels, each of which has a unique 18-bit ID. At design time, the system 200 precomputes the swept volume for every edge's motion, and records it as the collection of voxel IDs in that swept volume. If the swept volume even partially intersects a voxel, it is included in the collection of voxel IDs in that swept volume. This is why using a finer resolution is better. Then, at runtime, the sensors 282 tell the processor 212a what is in front of the robot 102, but at a much finer granularity than the voxels representing the precomputed swept volume, so the system 200 processes the sensor input and communicates to the processor 212a which of the voxels are currently occupied. In some embodiments, the processor 212a processes the sensor input and in other embodiments, there are separate processors, such as those of the sensors 282, which processes the sensor input and communicates to the processor 212a. The processor 212a compares the voxels or boxes currently in the environment based on the information stored in environment memory 294 to the voxels or boxes listed for each edge of the planning graph edge information stored in planning graph edge information memory 284 to determine which edges are currently in collision. In such embodiments, it is important that the same discretization is used at design time as at runtime in order to enable the comparison.

When the system 200 selects to use non-uniform discretization, the system 200 may still use 18-bit voxel IDs and $2^{18}$ voxels, but the voxels need not be cubes (or they could be cubes but not of all the same size). Once again, it is important in this embodiment that the system uses the same discretization at design time as at runtime. When using a non-uniform discretization, the system 200 selects what each voxel's size and shape is, using training such as that described above, such that the system picks the voxel sizes and shapes that will be used at design time and at runtime that are assessed to be most effective. The evaluation criteria used in such training may include criteria regarding the fraction of tasks that can be solved (e.g., the system 200 can find some collision-free path to accomplish the goal of the robot 102) and the quality of the paths that are found.

A motion planning graph or roadmap toolkit allows creation or generation of a motion planning graph (interchangeably referred to herein as a roadmap or roadmap file) that is used by a motion planner (e.g., the Realtime Robotic Motion Planning Accelerator and the RapidSense Spatial Perception system). The motion planning graph toolkit is implemented as a set of processor-executable instructions or application (e.g., software and/or firmware) stored on one or more nontransitory computer- or processor-readable media. The motion planning graph toolkit provides an intuitive user interface, for example an intuitive graphical user interface (GUI). The application allows an end user to interact with a digital or virtual model of a robot and a digital or virtual representation of an operational environment (interchangeably referred to herein as a work cell) in which the robot will operate, to generate or create kinematic-checked and collision-checked motion planning graphs or road maps.

An overview of some of the high level concepts is initially provided immediately below in order to facilitate understanding of system, applications, user interface and operation.

A Project is a top level container in the motion planning graph or roadmap toolkit. Each project contains a set of named Workspaces, a set of Hubs, a set of Roadmap Regions, and the Voxel Region.

A Workspace represents a certain physical configuration of a robot in an environment. Any modification to the robot's physical configuration that would result in different collisions possibilities with the surrounding work cell or itself should be considered a separate workspace. Thus, even if all obstacles in an environment remain fixed, a change in a physical characteristic of a robot from that of a first workspace corresponds to a separate second workspace.

Workspaces each have their own set of Roadmap Regions. It is noted that a workspace may be duplicated to clone the same regions across different workspaces. While working in the motion planning graph or roadmap toolkit, there is the concept of the "active workspace." This is the workspace that is currently being visualized in a three-dimensional view provided by the motion planning graph or roadmap toolkit. Each workspace also inherits all the "Hubs" defined in the top level project, and contains settings for how each roadmap region connects to other regions and hubs. This setting is called the Interpolation Matrix. When generating edges, each roadmap region is connected internally, as well as to other regions and hubs based upon these settings. Workspaces also contain settings for which pairs of links in the robot or static scene are collision-checked against one another. This set of settings is called the Collision Matrix. For each workspace defined in the project, the user will cause the system or application to generate an "Occupancy Group" or *.og file to be used at runtime, for example, on the Realtime Robotics Motion Planning Accelerator (MPA).

The Voxel Region represents a field of view for cameras used by the system. The MPA will check and/or avoid dynamic obstacles only if they are in this region. Any pose or edge that exists inside the voxel region will be "voxelized"; that is the physical space the robot takes up at a pose (or if in edge mode, a set of all the intermediate poses in the edge) will be calculated and saved as voxels. The collections of voxels for each edge are saved in the "Occupancy Group" file that is sent to the MPA hardware for collision checking during runtime.

A Roadmap Region is a grouping of poses. When generating edges, all poses in a roadmap region are connected together, as well as to other regions and hubs in a network based upon the settings in the interpolation matrix. The dimensions, density, and location of a roadmap region can be configured. All the poses in a roadmap region are seeded with various configurations of the robot, called origin poses that are specified when creating or modifying a roadmap region.

A hub is a specific pose of the robot that is shared across all workspaces. By default, all roadmap regions will connect to all hubs. Hubs are useful for specifying home poses and for enforcing connectivity between multiple roadmap regions.

When dealing with robots with moveable appendage(s), a pose is a specific point of the end effector in three-dimensional space combined with a specific joint configuration of a robot. When dealing with an autonomous vehicle, a pose is a specific point and orientation in three-dimensional space of the autonomous vehicle. A pose has an x, y, z translation, along with a rotation component that describes where an end effector of a robot is in three-dimensional space when the joint(s) of the robot are at a specific joint configuration. A pose is valid if the robot arm can reach that point in space without colliding with itself or other objects in the static workspace. Poses that collide or are kinematically infeasible are considered invalid, which may be visually indicated (e.g., colored red).

An edge is a connection between any two poses and represents a transition between the two associated poses. An edge also has an interpolation type. The motion planning graph or roadmap toolkit supports joint interpolation and Cartesian interpolation. In joint interpolation mode, motion is calculated by linearly interpolating in the joint space of the robot between endpoint joint configurations. In Cartesian interpolation mode, the motion is calculated by interpolating in three-dimensional space between the two endpoint frames at a discrete set of autonomously generated additional poses.

In either interpolation mode, edges may be valid or invalid. As is the case with poses, an edge will be invalidated if any part thereof is kinematically infeasible and/or in collision.

Collision parts are simple bounding shapes that can be attached to arbitrary locations on the robot or the modeled environment or scene. Typically, collision parts are used to represent a change in collision volume when a robot picks or places an object. Collision parts can also be used to create arbitrary keep-out zones if so desired.

The collision matrix defines a set of pairs of "Universal Robot Description Format" (URDF) links that should be checked for collision when generating poses and edges. If two things will never collide, the pair of things can be removed from the checking, which allows for faster edge generation. There is one collision matrix per workspace, improving performance of the system or application.

The interpolation matrix defines how each roadmap region connects to other regions and hubs. The options for each connection are joint interpolation, Cartesian interpolation, or not connected.

The motion planning graph or roadmap toolkit may work with Robot Operating System (ROS). ROS is a robotics middleware (i.e., collection of software frameworks for robot software development). Such may also employ macros. For example, the motion planning graph or roadmap toolkit may work with Catkin, a collection of CMake macros and associated code used to build packages used in ROS.

Operation will now be described, with reference to various user interface elements illustrated in FIGS. 3A-3K.

To get started creating a motion planning graph or roadmap, a processor-based system or an application executing on a processor-based system receives a number of initial input specifications via a number of user interface elements.

For example, the processor-based system or application may receive a description or digital model of a robot, for instance as a digital file. For the robot being modeled, this file defines visual meshes, collision meshes, and kinematics. The digital model can be created manually, or through an export process from a Computer Aided Design (CAD) application (e.g., software and/or firmware). The description of the robot may be provided using a standardized format, for example the URDF. For example, there is a commercially available plugin that converts a SolidWorks® assembly into a URDF file.

Also for example, the processor-based system or application may optionally receive a path specification to an ROS package, for instance if the URDF file contains links to a ROS package. The ROS_PACKAGE_PATH is an environment variable that contains all the possible paths to ROS packages in a catkin workspace. This variable allows the processor-based system or application to successfully locate and parse the URDF file.

Also for example, the processor-based system or application may optionally receive one or more files that file contain additional information about the robot not contained in the URDF standard. The additional information may be received in a standard format for example a "Semantic Robot Description File" (SRDF) format. One of the additional pieces of information may, for example, be a "collision matrix" defining which links within the URDF should be collision-checked against each other. This file may be imported into the processor-based system or application to extract the collision matrix used by the processor-based system or application to check the validity of poses and edges.

Figure 3A:
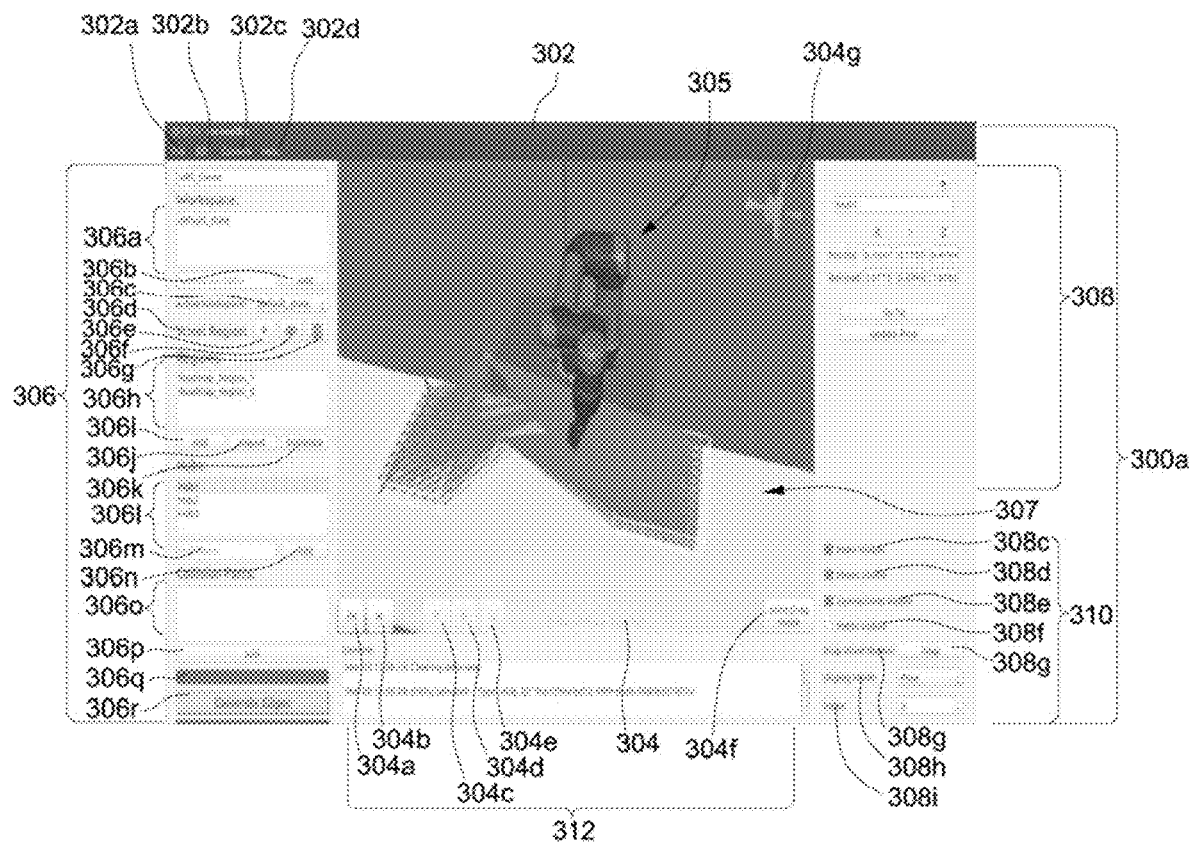
FIG. 3A is a screen print of a first screen of a graphical user interface presented at a first time by the processor-based system of FIG. 2, to a priori generate motion planning graphs, according to one illustrated implementation.
Figure 3B:
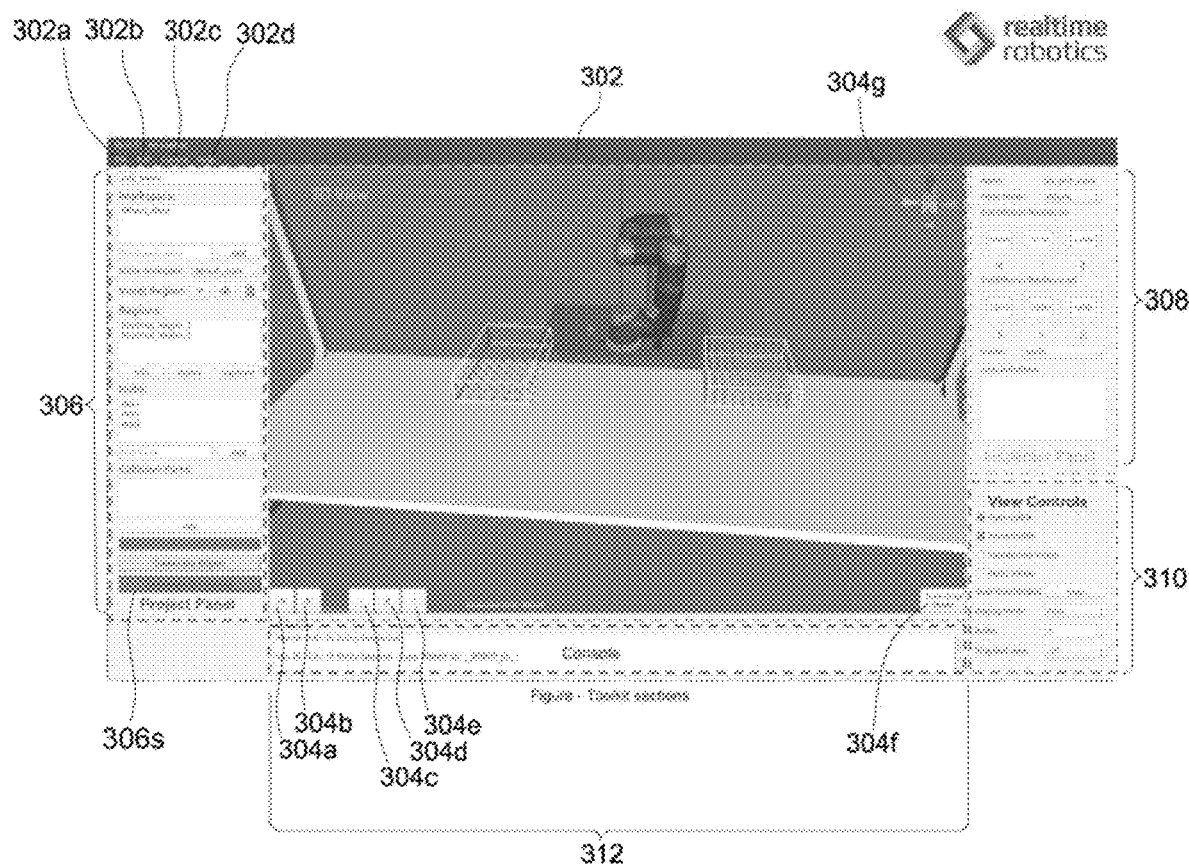
FIG. 3B is a screen print of a first screen of the graphical user interface presented at a second time by the processor-based system of FIG. 2, according to one illustrated implementation.

FIG. 3A shows a first screen 300a of a graphical user interface presented at a first time by the processor-based system of FIG. 2, to a priori generate motion planning graphs, according to one illustrated implementation. FIG. 3B shows the first screen 300b of the graphical user interface presented at a second time by the processor-based system of FIG. 2, according to one illustrated implementation.

The first screen 300a includes a menu bar 302 that includes four pull down menus, namely a file menu 302a, an edit menu 302b, a camera menu 302c, and a help menu 302d. The first screen 300a also includes a presentation window 304 in which a three-dimensional representation of the robot model 305 and the operational environment or work space 307 are presented. The first screen 300a further includes a set of panels which flank the presentation window 304, and which include various user interface elements that provide information or allow entry or selection of user input. The panels may, for example, include a project panel 306, an inspector panel 308, views controls panel 310 and a console panel 312.

File Menu

The file pull-down menu 302a provides a number of user-selectable options related to files.

For example, an end user may select a new project menu item from the file pull-down menu 302a. In response to selection of a new project menu item from the file pull-down menu 302a, the system or application may causer a "new project" dialog box 314 to be presented.

New Project Dialog Box

Figure 3C:
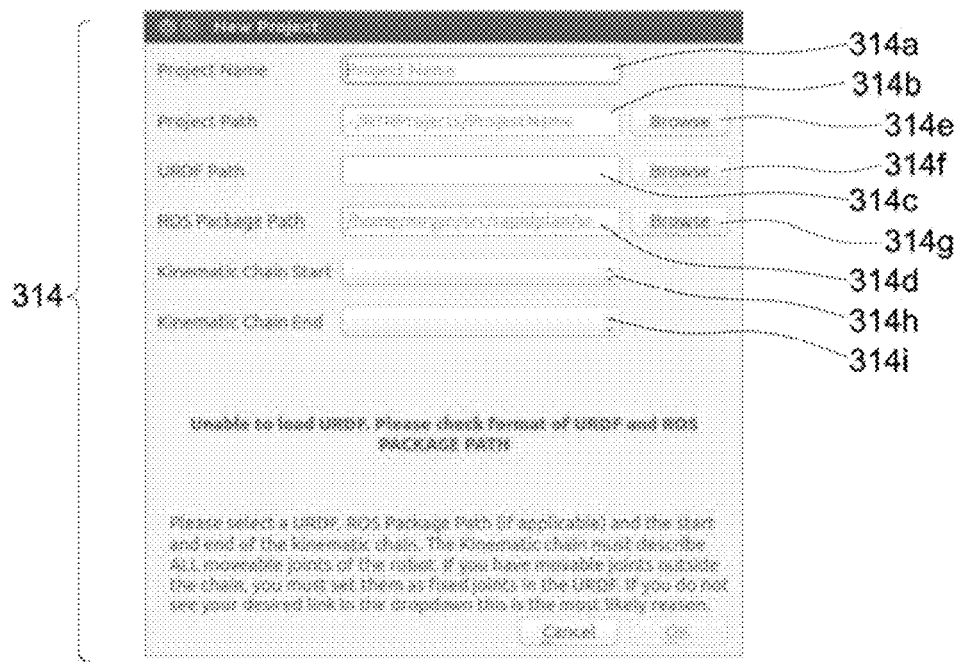
FIG. 3C is a screen print of a new project dialog box of the graphical user interface presented by the processor-based system of FIG. 2, according to one illustrated implementation.

FIG. 3C shows a new project dialog box 314 of the graphical user interface presented by the processor-based system of FIG. 2, according to one illustrated implementation.

The new project dialog box 314 prompts a user to create a new project. The new project dialog box 314 provides a "Project Name" field 314a to enter a name that will become the directory name for the project. The new project dialog box 314 provides a "Project Path" field 314b to enter a directory in which the project will be created. The new project dialog box 314 provides a "URDF Path" field 314c to enter a path to a URDF or *.xacro file to use. The new project dialog box 314 provides a "ROS Package Path" field 314d to enter a "package://" prefix to specify file paths if the URDF uses such. This can be used to specify a path to those top-level directories. The new project dialog box 314 provides a set of user-selectable browse icons 314e, 314f, 314g corresponding to the Project Path field 314b, URDF Path field 314c, and the ROS Package Path 314d, respectively, selection of which allows the user to browser for appropriate inputs to select for the respective fields.

The new project dialog box 314 provides a "Kinematic Chain Start" field 314h to specify a robot link from the URDF where the kinematic chain will start. The specified link should not have any moveable parent joints. In particular the Kinematic Chain Start field may provide a scrollable list of links to select from. The new project dialog box 314 provides a Kinematic Chain End field 314i to specify a robot link from the URDF were the kinematic chain will end. This link should be a child of the kinematic chain start, and have no moveable joints as children. In order for the collision checking to be possible, each movable joint in the robot must be fully known for each pose.

File Menu

Returning to FIGS. 3A and 3B, the file pull-down menu 302a may include a user-selectable "Load Project" menu item, selection of which causes the system or application to load an existing project. The file pull-down menu 302a may include a user-selectable "Save Project" field menu item, selection of which causes the system or application to save a current project in a same location. Selection will delete any autosaved files that exist for the project. The file pull-down menu 302a may include a user-selectable "Save Project As" menu item, selection of which causes the system or application to copy the current project to a new location as a new instance. The file pull-down menu 302a may include a user-selectable "Load Scene Snapshot" menu item, selection of which causes the system or application to load a snapshot created from an rtr-api into the presentation window 304 for viewing. The file pull-down menu 302a may include a user-selectable "Export Configs" menu item, selection of which causes the system or application to export all the valid joint configurations of the active workspace. The file pull-down menu 302a may include a user-selectable "Export Edges" menu item, selection of which causes the system or application to export all the valid edges of the active workspace. The file pull-down menu 302a may include a user-selectable "Export Poses" menu item, selection of which causes the system or application to exports all the valid poses of the active workspace.

With continuing reference to FIGS. 3A and 3B, the "edit" pull-down menu 302b allows a user to select a "settings" menu. The "settings" menu provides user-selectable options for project settings and workspace settings.

The project "settings" allow the user to set (e.g., toggle) automatic pose validation. The automatic pose validation setting determines if any change to a roadmap region or hub will result in the system or application automatically recalculating the poses. This process happens in the background. A user may want to disable automatic pose validation if working with very large motion planning graphs or roadmaps.

The project settings allow the user to set (e.g., toggle) whether origin poses will rotate with region or not. The origin poses rotate with region setting determines how rotating a roadmap region will operate. If the origin poses rotate with region setting disabled, the orientations of the poses in a roadmap region will remain fixed with respect to the world. If the origin poses rotate with region setting enabled, those orientations will rotate with the region as a whole.

The workspace settings allow the user to set the kinematic chain. The kinematic chain settings sets the kinematic chain the system uses for collision checking pose calculation. This chain is not editable once set. To change the kinematic chain settings the end user creates a new project. The workspace settings allow the end user to configure which links in the URDF are collision-checked against each other. Thus, the end user can elect to disable collision-checking between links that will never collide, due to physical location or joint limit restrictions, advantageously reducing processing time. Configuration may be implemented via a collision matrix.

An end user can cause the system or application to import a collision matrix from an SRDF file, for example via an "import SRDF" user interface element. An end user can cause the system or application to define how motion planning graphs or roadmaps connect to each other, and/or connect to hubs, via an "interpolation type matrix" user interface element. Available options may include: JOINT, CARTESIAN, or NOT CONNECTED.

One or more tabs allow an end user to create various parts that can be attached to arbitrary locations to any link in the URDF. The system or application uses these parts when performing collision checking. Parts can take any of a variety of forms, for example a box, sphere, or cylinder, and may be stored as a parts library. The sizes of the parts can be specified or adjusted by the end user.

Camera/View Point Menu

The camera or view point menu 302c allows a user to switch views, for example switching between a perspective view mode and an orthographic view mode. Alternatively, a cube at a center of a set of axes presented in the three-dimensional view (located in the top-right corner) can be selected (e.g., clicked) to toggle between the camera settings.

Help Menu

Selection of the help pull-down menu 302d causes presentation of a help menu with various help menu items from which a user can select.

Presentation Window

The presentation window 304 provides a three-dimensional view of the loaded robot work cell. An end user can pan, orbit, and zoom within the presentation window 304. Hubs, roadmap regions, poses, edges and the voxel region are all visualized in the presentation window 304. Selecting (e.g., clicking on) an object (e.g., the robot) will make that the selected object.

There are several different ways to manipulate both the robot model 305 and any roadmap region using tools available in the presentation window 304.

The presentation window 304 includes a "FK Panel" user-selectable icon 304a, selection of which causes presentation of an FK panel. The FK panel allows an end user to specify joint angles as input, and the system or application would determine the corresponding position of the robot in three-dimension space, and present the corresponding three-dimensional position of the robot.

The presentation window 304 includes a "IK Panel" user-selectable icon 304b, selection of which causes presentation of an IK panel. The IK panel allows an end user to specify a position of at least a portion (e.g., end effector) of the robot in three-dimensions, and the system or application would determine the corresponding joint angles of the robot to position the portion of the robot in three-dimensional space, and present the corresponding joint angle.

The "FK panel" and "IK panel" also simply translate between C-space and three-dimensional or real world space. The "FK panel" and "IK panel" also allow an end user to make fine adjustments to a translation and/or rotation of the end effector. The increment of each adjustment can be changed. The current position can be viewed in the "world" frame of reference, or in a frame of reference of any defined roadmap regions.

The presentation window 304 includes translation widget 304c. Depending which item is selected, the system or application causes the translation widget 304c to appear at the end effector of the robot, or at the origin of a roadmap region or a voxel region. The translation widget 304c allows an end user to drag the selected item around in three-dimensions (x, y, or z axis), for instance by positioning a pointer or cursor (e.g., mousing over) and selecting (e.g., clicking) on the corresponding axis. The translation widget 304c can be enabled/disabled by selecting (e.g., clicking) a user-selectable icon (e.g., "T" button).

The presentation window 304 includes a rotation widget 304d. Depending on which item is selected, the system or application causes the rotation widget 304d to appear at the end effector of the robot, or at the origin of a roadmap region. The rotation widget 304d allows an end user to rotate the selected item around three axis (x, y, or z axis) by selecting (e.g., clicking) and dragging around the corresponding axis while selected. The rotation widget 304d can be enabled/disabled by selecting (e.g., clicking) a user-selectable icon (e.g., "R" button).

The presentation window 304 includes a scaling widget 304e. The system or application causes cause the scaling widget 304e to appear at the origin of a roadmap or voxel region. The scaling widget 304e allows an end user to change the dimensions of the selected object in three-dimensions (x, y, or z). If scaling a roadmap region, the system or application will automatically increase and/or decrease a number of poses inside the region based on a density setting for that particular region.

The presentation window 304 includes joint drag mode user-selectable icon 304f. When the joint drag mode is active, the translation, rotation, and scaling widgets 304c, 304d, 304e are disabled, and the end user can hover (e.g., mouse over) over a movable link on the robot representation. When the link is selected, the system or application will visually indicate such (e.g., highlight link) and will cause presentation of a visual indication (e.g., helix) representing the possible joint travel. An end user can then move a representation of the link (e.g., ball) relative to the visual indication, for instance moving a ball up and down on the helix to control the position of the joint. The system or application updates the position according to the input.

The presentation window 304 includes a set of three-dimensional controls 304g. The end user can manipulate the three-dimensional controls 304g to cause the system or application to adjust a three-dimensional view presented in the presentation window 304. For example, the end user can pan around the represented scene by, for example holding down a button on a mouse or other pointing device. The end user can rotate the view by holding down another button on a mouse or other pointing device. The end user can control zooming, for instance via a scroll wheel on a mouse or other pointing device. The presentation window 304 may, for example, include a three-dimensional control icon 304g (e.g., illustrated at top right of presentation window 304), which the end user can manipulate with a pointer, and which allows the end user to quickly move to a specific axis aligned view, as well as switch between orthographic and perspective modes.

Project Panel

The project panel 306 lists all the objects in the current workspace and projects. Selecting (e.g., clicking on) an item will make the item the selected item, provide more information.

The project panel 306 includes a workspace section 306a that allows the end user view all of the available workspaces, as well as create new workspaces. To create a new workspace, the end user types in a name in the "Workspace Name" text field and selects the "add" user-selectable icon 306b. The end user can also use the "Active Workspace" dropdown menu 306c to select which workspace is the current workspace. It is noted that creating a new workspace does not automatically make the new workspace the active workspace. The currently active workspace is displayed in the presentation window 304, and all regions and collision parts listed on the project panel 306 are based on the active workspace. An end user can duplicate an existing workspace by selecting (e.g., clicking on) the workspace to clone, then selecting a "duplicate" user-selectable icon 308a on the project panel 306.

The project panel 306 includes a voxel region section 306d. The voxel region section 306d has three user-selectable icons (e.g., buttons), each with a different function. A "Target" user-selectable icon 306e lets the end user select the voxel region so the inspector panel 308 shows details about the selected voxel region, as well as brings up the transform or scale controls in the presentation window 304. The "Eye" user-selectable icon 306f lets the end user toggle the visibility of the voxel region on the presentation window 304. The "Voxel" user-selectable icon 306g lets the end user toggle the visibility of voxels on the presentation window 304.

The project panel 306 includes roadmap regions section 306h. The roadmap regions section 306h shows the end user all of the available roadmap regions in the active workspace. Selecting (e.g., clicking on) on a region will select that region on the inspector panel 308, and in the presentation window 304 so the selected region can be rotated, scaled, or transformed. Selecting (e.g., clicking on) an "Add" user-selectable icon 306i will cause the system or application to create a new roadmap region at a current location of the end effector of the robot, and bring up a menu to allow the end user to add new origin poses. Selecting (e.g., clicking on) an "import" user-selectable icon 306j will cause the system or application to prompt the end user to select files for import. Imported roadmap regions can be transformed and rotated, but not scaled. Selecting (e.g., clicking on) a "Duplicate" user-selectable icon 306k will clone the selected roadmap region.

The project panel 306 includes a hubs section 306l. The hubs section 306l presents all available hubs that have been created in the project. An end user can select (e.g., click on) an entry and have the hub be selected in the inspector panel 308. Double selecting (e.g., double clicking) on an item may cause the system or application to move the robot model to a pose identified by the selected hub. A new hub may be added, for example by entering a name in a name field 306m, and selecting (e.g., clicking) an "add" user-selectable icon 306n. In response, the system or application will create a new hub at a current location of the end effector of the robot model.

The project panel 306 includes a collision parts section 306o. The collision parts section 306o presents all the parts currently attached to a robot model, or operational environment. Selecting (e.g., clicking on) on one of the parts causes the system or application to present the inspector panel 308 for the selected item. End users can attach a new part by selecting (e.g., clicking on) an "Add" user-selectable icon 306p, selection of which causes the system or application to prompt the end user to name the connection, select a part from the part library to attach, identify which link to attach the part to, and specify an offset for how the part should be connected to a parent link. If there are no parts in the part library, a part can be added via the settings panel. Attaching a part will also cause the system or application to modify the collision matrix of the current workspace. By default the collision part will not be collision-checked against the parent link, but will be collision-checked for all other links in the URDF. If a part is attached to a link that is not in the kinematic chain, the system or application still treats that as a collision. If attaching a part invalidates poses which cannot be explain, the end user may check to make sure the collision matrix is correct for the newly attached part.

The project panel 306 includes a pose validation status section (e.g., blue bar at bottom of the project panel) 306q. The pose validation status section 306q provides an indication of a percentage of pose validation that has been completed. The system or application performs pose validation anytime a region or hub is you created or modified. This system or application performs this process in the background, and when completed all poses will identified as either valid or invalid. The system or application may visually represent valid poses using a first visual characteristics (e.g., colored green), visually representing invalid poses using a second visual characteristics (e.g., colored red). If an item that requires pose generation is modified while validation is already being performed, the system or application will restart the validation process. Typically pose validation will be performed automatically, but the end user may disable this feature via the settings panel, for instance for large motion planning graphs or roadmaps. If automatic pose validation is disabled, a "Validate" user-selectable icon (e.g., green button) will be presented, for example under the progress bar.

The project panel 306 includes generate edges user-selectable icon 306r. Once the graphs or roadmaps have been set up and pose validation has been completed, the end user may select (e.g., click) the "Generate Edges" user-selectable icon 306r. Selection the "Generate Edges" user-selectable icon 306r causes the system or application to launch a process that connects all the poses in a currently active workspace into one connected roadmap. During this process, the system or application will use the settings for each roadmap region and the interpolation matrix to determine which poses to connect to each other. The system or application then collision checks each possible connection to determine if the connection is valid or not. After this process is completed, the end user may wish to visualize the edges.

The project panel 306 includes a "Connections Visible" user-selectable icon (e.g., checkbox, radio button). The system or application will present the valid edges using a first visual characteristic (e.g., blue), while presenting invalid edges using a second visual characteristic (e.g., red). Depending on the complexity of the current workspace, the system or application may take some time to determine valid edges and render such.

Once the edges are satisfactory, an occupancy file may be generated for the currently active workspace. The occupancy file may be employed by the MPA, for instance during runtime operation. The project panel 306 includes a Generate Occupancy user-selectable icon (e.g., checkbox, radio button). Selection (e.g., clicking) of the Generate Occupancy user-selectable icon 306t causes the system or application to generate the occupancy file for the currently active workspace. In system or application may prompted the end user to select a filename for the occupancy file. Upon entry of a name, the end user can select (e.g., click) a "Save" user-selectable icon. Selection of the "Save" user-selectable icon causes the system or application to start the generation process, which depending on the complexity of the roadmap can take a long time. It is noted that a respective occupancy file may be generated for each workspace in use.

Inspection Panel

The inspector panel 308 presents information about the currently selected object. The inspector panel 308 may be context sensitive, and information displayed will be different depending which type of object is selected. For example, the inspector panel 308 may present a position and orientation of an end effector of the modeled robot, in real world coordinate frame of reference or some other coordinate frame of reference as selected via a coordinate frame selection user interface (e.g., pull-down menu or list) 308b. The inspector panel 308 may also show a list of any links that the system or application determines to be in collision based on collision analysis.

Views Control Panel

The view controls panel 310 includes widgets which control what objects are displayed in the presentation window 304. The view controls panel 310 allows the end user to select which pose or edge is visualized when displaying voxels or viewing paths.

A "Hubs Visible" user interface element (e.g., checkbox) 308c, allows the end user to select (e.g., if checked) to have the hubs that have been created in the project displayed in the presentation window 304.

A "Poses Visible" user interface element (e.g., checkbox) 308d, allows the end user to select (e.g., if checked) to have the poses that have been generated for the active workspace displayed in the presentation window 304.

A "Connections Visible" user interface element (e.g., checkbox) 308e, allows the end user to select (e.g., if checked) to have the edge connections that have been generated for the active workspace displayed in the presentation window 304.

A "Paths Visible" user interface element (e.g., checkbox) 308f, allows the end user to select (e.g., if checked) to have the path the arm will travel through for the current index displayed in the presentation window 304 if the Display Mode is Edge Mode. If "Paths Visible" user interface element is unchecked and the display mode is in Edge Mode, the robot arm will move back and forth along the selected edge.

A "Snap Voxel Region" user interface element (e.g., toggle) 308g, allows the end user to select to have the system or application calculate and update the position and dimensions of the voxel region so the resulting voxel region encloses all positions of the robot on every generated edge in the motion planning graph or roadmap.

A "Display Mode" user interface element (e.g., pull-down menu) 308h, allows the end user to select between a Pose Mode and an Edge Mode for the presentation in the presentation window 304. When in Pose Mode, a change in a value of an "Index" field, will cause the system or application to jump the robot arm to the position indicated. When in Edge Mode, a change in a value of the index field, will cause the system or application to move the arm of the robot back and forth along the selected edge, or if "paths visible" is selected, the system or application will cause presentation of a path the end effector takes for that edge.

An "Index" user interface element (e.g., field) 308i, allows the end user to select which pose or edge is active and how that pose or edge is displayed. When poses or edges are generated, they are stored in the system in a large array.

A "Snapshot View" user interface element (e.g., pull-down menu) 308j, allows the end user to select which type of data is displayed if a snapshot has been loaded from the "File" menu into the system.

Console Panel

The console panel 312 displays all log output from the system or application. The console panel 312 displays messages, warnings and errors from the system.

Figure 3D:
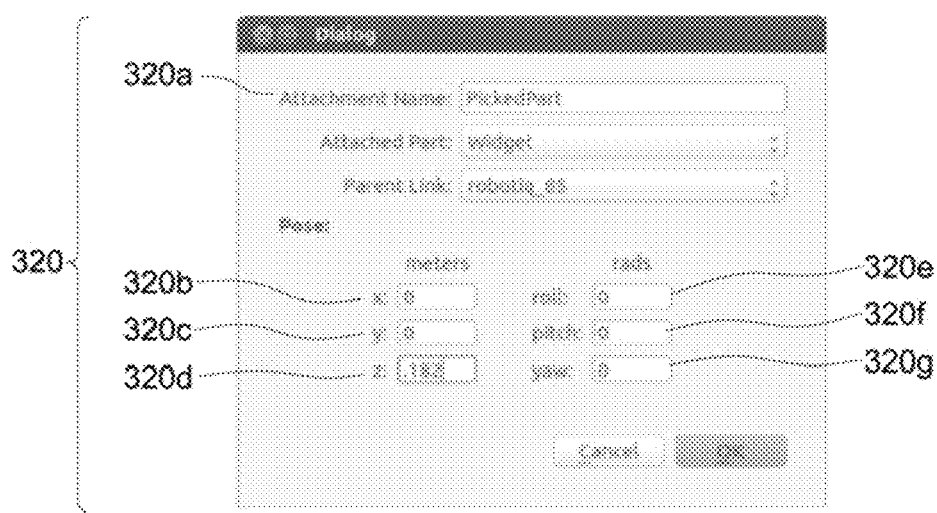
FIG. 3D is a screen print of a collision part attachment dialog box of the graphical user interface presented by the processor-based system of FIG. 2, according to one illustrated implementation.

FIG. 3D shows a "collision part attachment" dialog box 320 of the graphical user interface presented by the processor-based system of FIG. 2, according to one illustrated implementation.

The "collision part attachment" dialog box 320 includes an "attachment name" field 320a to specify an attachment name, an attached part pull-down list to select an attach part, and a parent link pull-down list to select a parent link. The "collision part attachment" dialog box 320 also includes fields for entering a three-dimensional pose via x, y, z axis coordinates 320b, 320c, 320d, and angle of orientation about the x, y, z axes 320e, 320f, 320g. User selectable icons allow an end user to accept or cancel the attachment.

Figure 3E:
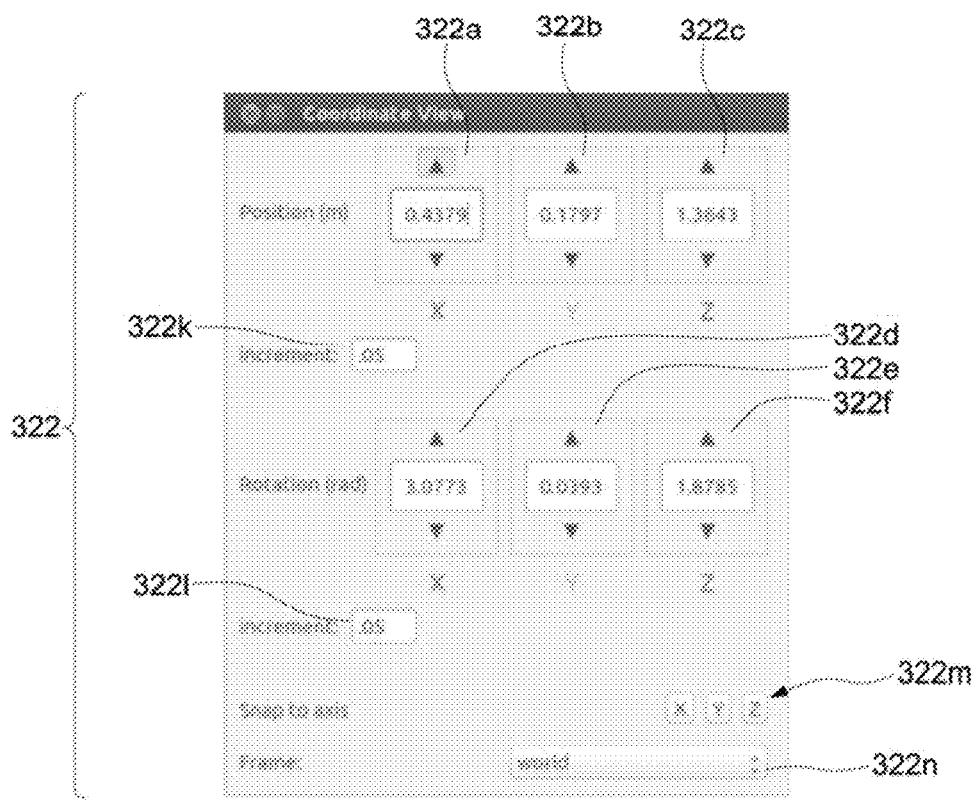
FIG. 3E is a screen print of an end effector dialog box of the graphical user interface presented by the processor-based system of FIG. 2, according to one illustrated implementation.

FIG. 3E shows an IK panel 322 of the graphical user interface presented by the processor-based system of FIG. 2, according to one illustrated implementation. The IK panel 322 can be used to specify a pose of an end effector of the robot that is being modeled.

The IK panel 322 includes position fields 322a, 322b, 322c and rotation fields 322d, 322e, 322f that display a three-dimensional pose via x, y, z axis coordinates, and angle of orientation about the x, y, z axes. The IK panel 320 includes a pair of user selectable position and rotation adjustment icons (e.g., upward arrow, downward arrow) 322g, 322h, 322i, 322j for each position and rotation field, selection of which adjusts the pose. The IK panel 320 includes position and rotation increment fields 322k, 322l to set a increment size that the positions and rotations are adjusted by when the position adjustment icon and/or rotation adjustment icon are selected, respectively. The IK panel 322 includes a set of snap to axis user-selectable elements (e.g., toggles) 322m, selection of which causes the system or application to snap a coordinate to a respective axis. The IK panel 322 includes reference frame pull-down list 322n, to select a reference frame (e.g., real world) in which coordinates are expressed.

As previously noted, the inspection panel 308 can be context sensitive, and information displayed based on what type of item is currently selected.

Figure 3F:
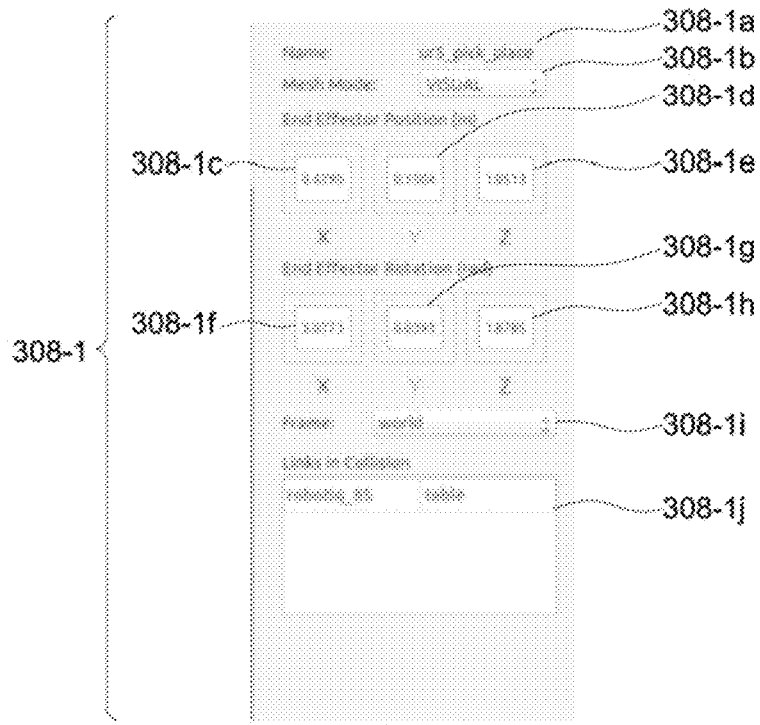
FIG. 3F is a screen print of a robot inspector dialog box of the graphical user interface presented by the processor-based system of FIG. 2, according to one illustrated implementation.

FIG. 3F shows the inspector panel 308 in the form of a robot inspector panel 308-1 of the graphical user interface presented by the processor-based system of FIG. 2, according to one illustrated implementation.

The robot inspector panel 308-1 shows information about the state of the robot in the active workspace. These include things such as a name 308-1a from the urdf, which mesh mode 308-1b is being used to draw the robot (collision or visual), and a pose of the end effector, for example a position in x, y, z axes 308-1c, 308-1d, 308-1e and orientation about the x, y, z axes 308-1f, 308-1g, 308-1h of the end effector (including which frame to view the coordinates in). A "reference frame selection" pull-down list 308-1i allows a user to select a reference frame. It also includes a table 308-1j which lists all the robot links that are currently in collision with each other. This information can help you quickly diagnose and correct any errors in the collision matrix for that current workspace. The robot inspector panel 308-1 can be made visible by clicking on any moveable link on the robot in the three-dimensional panel 304.

Figure 3G:
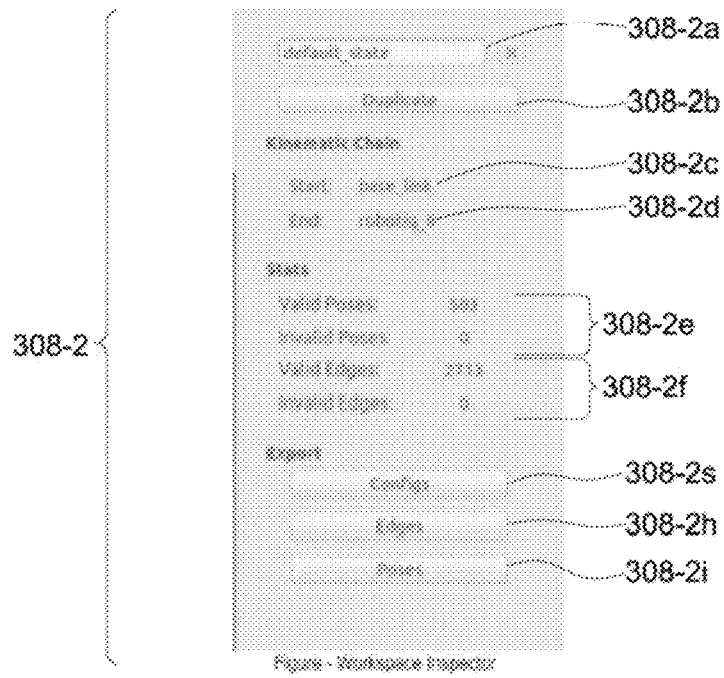
FIG. 3G is a screen print of a workspace inspector dialog box of the graphical user interface presented by the processor-based system of FIG. 2, according to one illustrated implementation.

FIG. 3G shows the inspector panel 308 in the form of a "workspace inspector" panel 308-2 of the graphical user interface presented by the processor-based system of FIG. 2, according to one illustrated implementation.

The "workspace inspector" panel 308-2 can be made visible by clicking on the workspace you would like to inspect on the project panel. The inspector panel 308-2 includes: a "state" field 308-2a that identifies a current state, a "duplicate" user-selectable icon (e.g., button) 308-2b, selection of which causes the system or application to duplicate or clone the workspace. The inspector panel 308-2 includes indications of a start link 308-2c and end link 308-2d of the kinematic chain used for IK solving. The inspector panel 308-2 also includes statistics, including indications of the number of valid and invalid poses 308-2e and valid and invalid edges 308-2f. The inspector panel 308-2 includes a "configs" user-selectable icon 308-2g, "edges" user-selectable icon 308-2h, and "poses" user-selectable icon 308-2i which provide the ability to export the generated joint configurations, edges and poses, respectively.

The workspace can be renamed by editing a name field (e.g., top field) in the workspace inspector panel 308. The workspace can be deleted by clicking selecting (e.g., clicking) on the "x" next to the name field.

A "voxel Region inspector" panel (not shown) presents current coordinates (x, y, z) of the voxel region, along with current dimensions thereof. The "voxel region inspector" panel can be made visible by selecting (e.g., clicking) on a "target" icon on the project panel.

A "roadmap region inspector" panel (not shown) presents information about a currently selected region and allows an end user to make changes to how poses in the region are generated and connect to each other.

When scaling a roadmap region, pose spacing values determine a spacing between each pose. For example, if the roadmap region is made larger, more poses will be added at the interval specified by a given pose spacing value.

"Connection density" values can specify or control the number of edges generated by the system or application. An internal value controls how many edges are generated between all the poses inside the currently selected region. An external value controls how many edges are generated between the currently selected region and all other regions, assuming the connection between regions are set to be connected according to the Interpolation Matrix An "Internal Motion Type" value determines if the edges between each pose in a selected roadmap region will be created using the JOINT or CARTESIAN interpolation type.

A "hub inspector" panel (not shown) shows the current position (x, y, z, roll, pitch, yaw) of the hub in the world frame. The Go To button will move the robot model to that hub, and clicking the "Update Pose" button will cause the hub's position and joint configuration to become that of the current robot model.

A "collision part inspector" panel (not shown) shows the name of the collision part, its current parent and mounting offset from its parent, as well as its dimensions. The part can be deleted by clicking on the "x" button next to the name field.

An inspector also lets the end user view and edit a position and size of a region by entering new numbers into the corresponding field, as well as manage "Origin Poses."

Figure 3H:
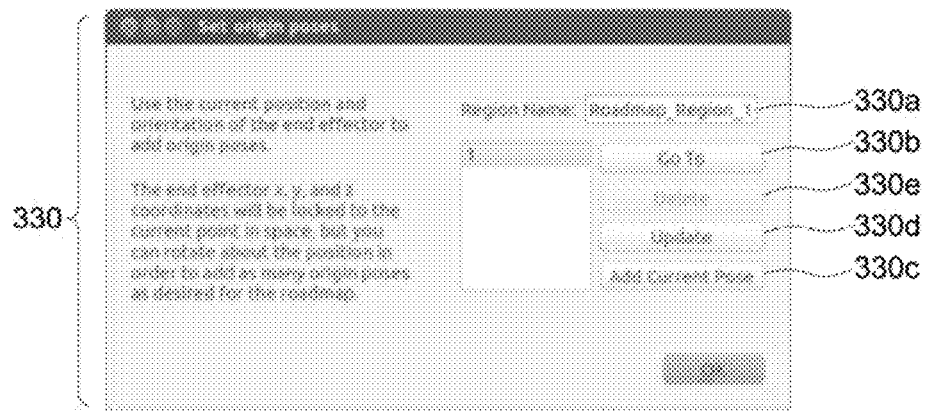
FIG. 3H is a screen print of a set origin pose dialog box of the graphical user interface presented by the processor-based system of FIG. 2, according to one illustrated implementation.

FIG. 3H shows a "set origin pose" dialog box 330 of the graphical user interface presented by the processor-based system of FIG. 2, according to one illustrated implementation.

Origin poses are the set of poses which describe how all of the other poses in a given roadmap region are seeded. Selecting (e.g., clicking on) the "manage origin poses" user-selectable icon (e.g., button) causes the system or application to lock the robot model into a mode where the end effector coordinates stays locked, but can be rotated around that point through the rotation control widget and/or the IK window.

The set origin pose" dialog box 330 includes a "region name" field 330a to enter or display a region name. The set origin pose" dialog box 330 includes a "go to" user-selectable icon 330b, selection of which causes the system or application to move the item to the selected pose. A new origin pose to the roadmap region can then be added by selecting (e.g., clicking) an "add current pose" user-selectable icon 330c. For each origin pose added to the roadmap region, the system or application will create a set of poses that match the region's density and spacing parameters, seeded with the orientation of the corresponding origin pose. If "Poses Visible" is enabled and multiple origin poses are added, the differences in orientation should be readily apparent. The set origin pose" dialog box 330 includes an "update" user-selectable icon 330d, selection of which causes the system or application to update the origin poses. The set origin pose" dialog box 330 includes a "delete" user-selectable icon 330e, selection of which causes the system or application to delete an origin pose.

Figure 3I:
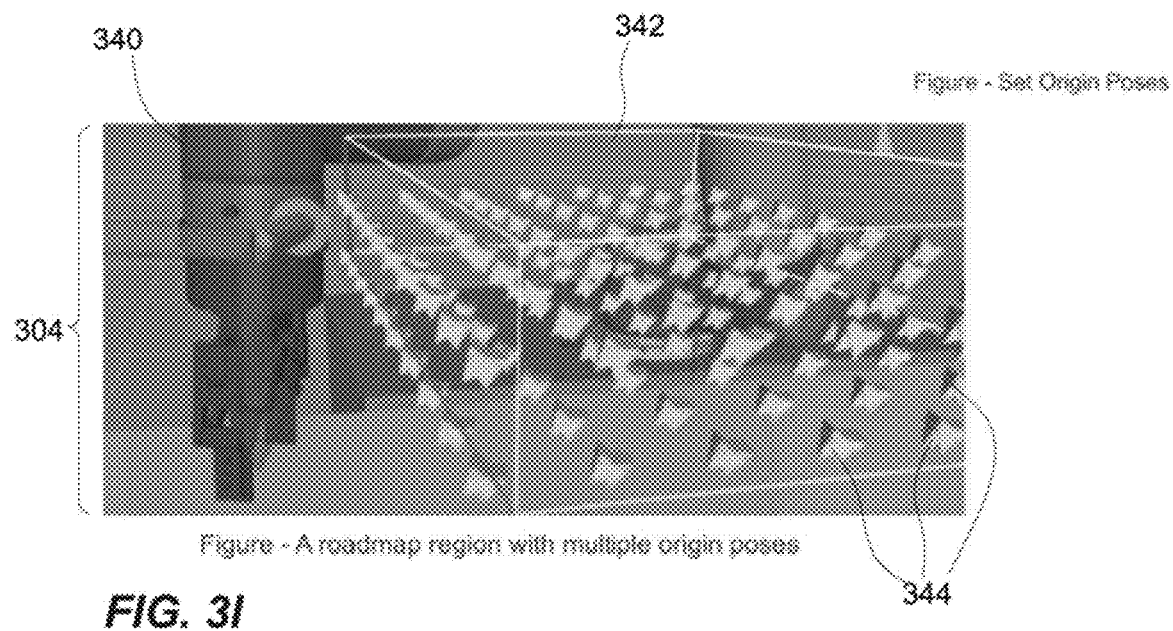
FIG. 3I is a screen print of a road map region window of the graphical user interface presented by the processor-based system of FIG. 2, showing an exemplary road map region with multiple origin poses, according to one illustrated implementation.

FIG. 3I shows a presentation window 304 of the graphical user interface presented by the processor-based system of FIG. 2 at a third time, showing an exemplary robot 340, road map region 342 with multiple origin poses 344, according to one illustrated implementation.

Figure 3J:
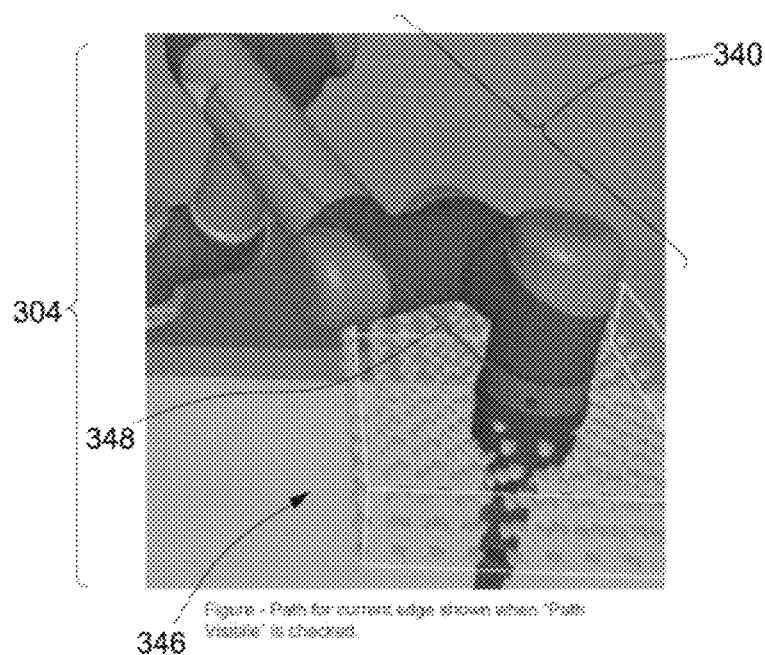
FIG. 3J is a screen print of a graphical user interface presented by the processor-based system of FIG. 2, showing an exemplary robot, workspace and path for a current edge when a path visible option is selected, according to one illustrated implementation.
Figure 3K:
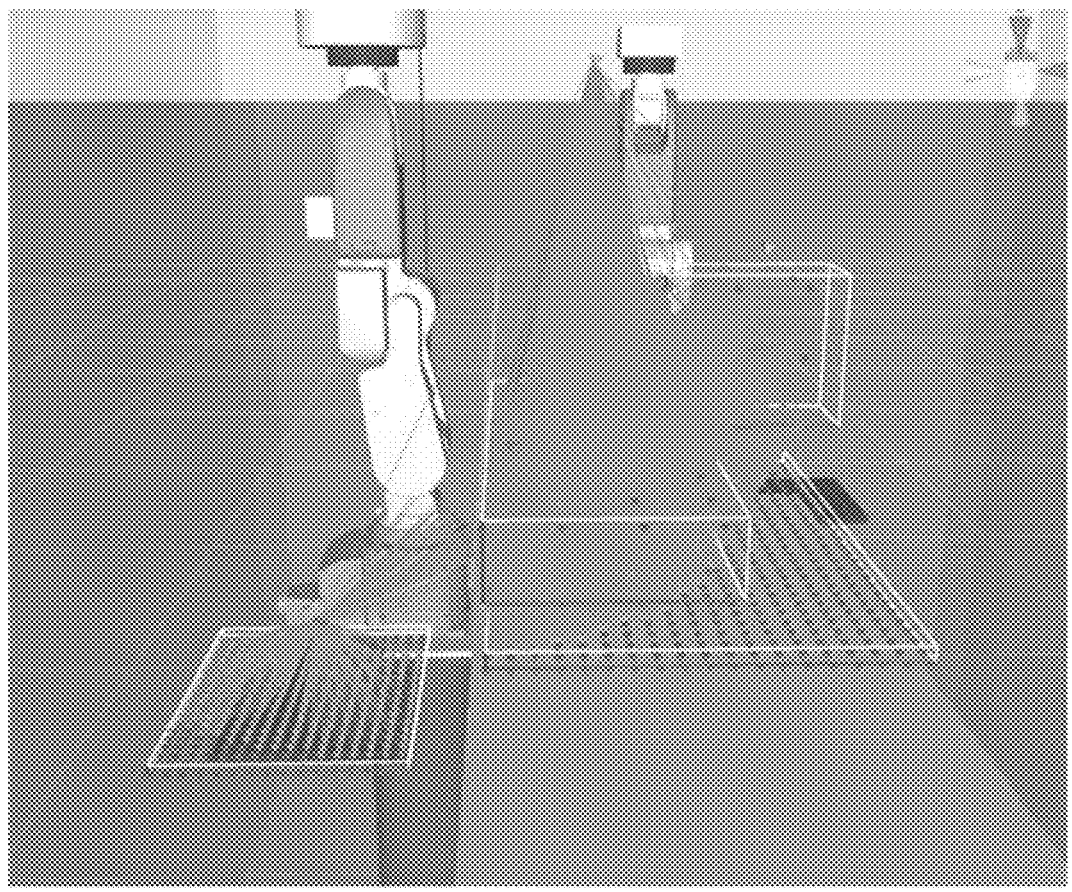
FIG. 3K is a screen print of a graphical user interface presented by the processor-based system of FIG. 2, showing an exemplary robot, workspace and edges, according to one illustrated implementation.

FIG. 3J shows a presentation window 304 of the graphical user interface presented by the processor-based system of FIG. 2 at a fourth time, showing an exemplary robot 340, workspace 346 and path 348 for a current edge when a path visible option is selected, according to one illustrated implementation.

Figure 4A:
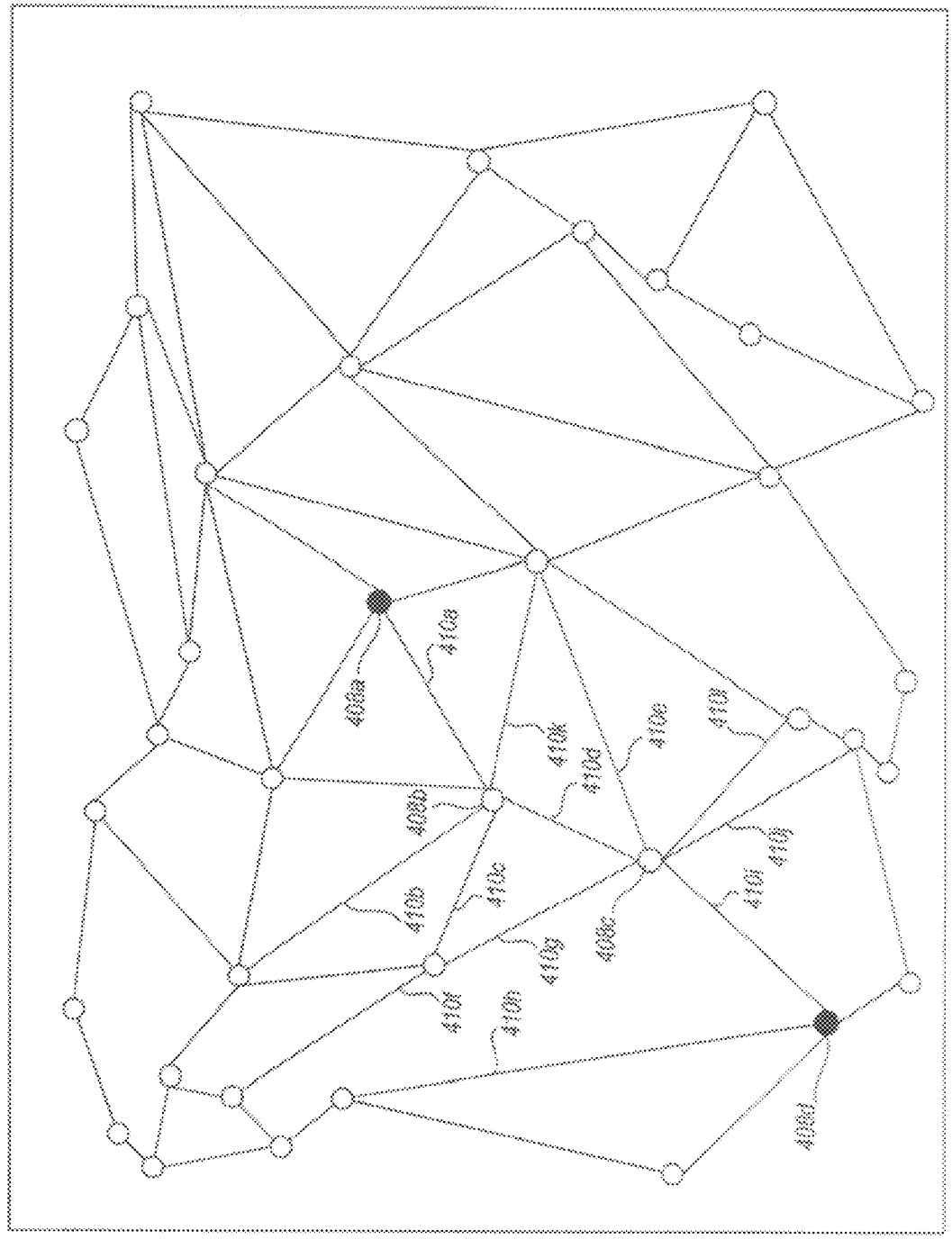
FIG. 4A is an example motion planning graph for the robot of FIG. 1, including edges of the planning graph for which it has been determined the corresponding transition would result in a collision between the robot and one or more obstacles in the environment, according to one illustrated embodiment.
Figure 4A:
Figure 4B:
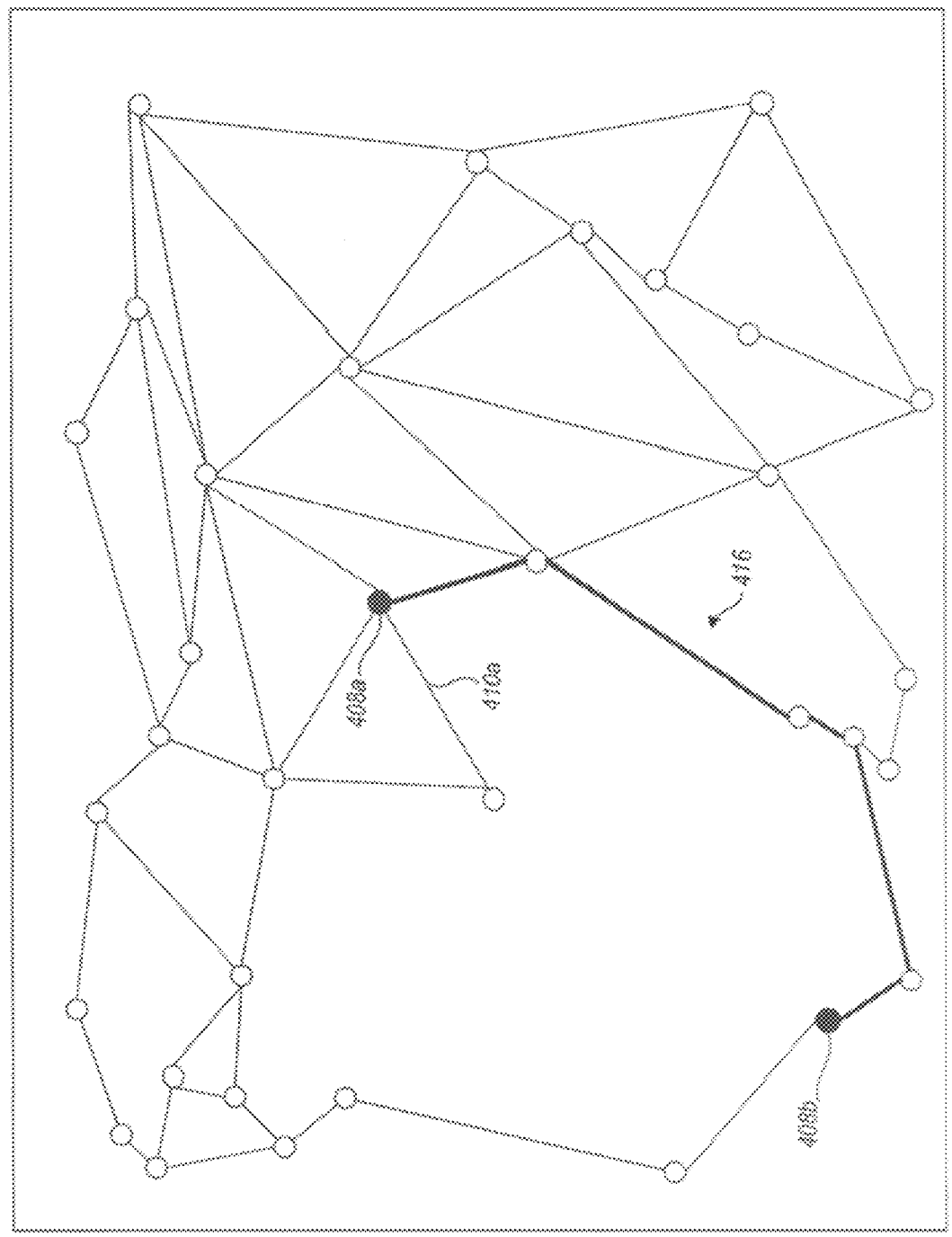
FIG. 4B is an example motion planning graph for the robot of FIG. 1 in which edges of the planning graph have been removed for which it has been determined the corresponding transition would result in a collision between the robot and one or more obstacles in the environment, according to one illustrated embodiment.

FIG. 4A is an example motion planning graph 400 for the robot 102 of FIG. 1, including edges of the planning graph 400 for which it has been determined the corresponding transition would result in a collision between the robot 102 and one or more obstacles in the environment 100, according to one illustrated embodiment. FIG. 4B is an example motion planning graph 400 in which edges of the planning graph 400 have been removed for which it has been determined the corresponding transition would result in a collision between the robot 102 and one or more obstacles in the environment 100, according to one illustrated embodiment. Each node of the planning graph 400 represents a state of the robot 102 and each edge of the planning graph 400 represents a transition of the robot 102 from one state to another state. For example, edge 410a represents a transition between a state of the robot 102 represented by node 408a and a state of the robot 102 represented by node 408b. Edge 410i represents a transition between a state of the robot 102 represented by node 408c and a state of the robot 102 represented by node 408d.

Each edge of the planning graph 400 for the robot 102 has some number of voxels (or boxes) corresponding to the volume in 3D space swept by the robot 102 when making the transition in the planning graph 400 from one state to another state represented by that edge. Such information may be stored as planning graph edge information in off-chip planning graph edge information memory 284, such that the system 200 can swap out different planning graphs to accommodate changing dimensions of the robot 102. Using information received from the sensors 282 representing the current environment at runtime, the system 200 determines which voxels (or boxes) are currently occupied, and the system 200 determines to not use any motion that would collide with any currently occupied voxel (or box).

In some embodiments, the system determines to not use any motion that would collide with any occupied voxel (or box) by comparing at runtime the information received from the sensors 282 and stored in on-chip environment memory 294 representing the current environment (and obstacles therein) with the planning graph edge information stored in planning graph edge information memory 284. Based on this comparison, the system 200 determines which planning graph edges represent transitions (and thus which corresponding motions) that would result in a collision between the robot 102 and one or more obstacles in the environment 100. As an example, FIG. 4A shows edges 410b, 410c, 410d, 410e, 410f, 410g, 410h, 410i, 410j, 410k and 410l have been determined to represent transitions (and thus which corresponding motions) that would result in a collision between the robot 102 and one or more obstacles in the environment 100.

For example, in order for the robot 102 to achieve a goal of moving from a state represented by node 408a to a state represented by node 408d, the robot 102 would have to avoid transitions represented by edges 410b, 410c, 410d, 410e, 410f, 410g, 410h, 410i, 410j, 410k and 410l that have been determined to represent transitions that would result in a collision between the robot 102 and one or more obstacles in the environment 100. Thus, FIG. 4B shows the planning graph with such edges removed and a potential path 416 in planning graph 400 identified by the system 200 in which the robot 102 may follow to achieve a goal of moving from the state represented by node 408a to the state represented by node 408d without colliding with one or more obstacles in the environment 100.

FIG. 5 shows a method 500 of operation in a processor-based system 200, according to one illustrated embodiment. The method 500 of operation in a processor-based system 200 commences at 502, for example in response to a call or invocation or powering on of a system.

At 504, a user interface is presented via a processor-based system or application executing via a processor-based system.

At 506, a robot model is received or specified via the processor-based system or application.

At 508, a discretized operational environment is received or specified via the processor-based system or application.

At 510, a representation of the robot model in the discretized operational environment is presented via the user interface presented via the processor-based system or application.

At 512, the processor-based system or application receives input specifying one or more seed poses, for example as input via the user interface. The seed poses may be manually entered, or provided as a file or link to a file.

Optionally at 514, the processor-based system or application autonomously performs kinematic checking and/or collision checking of the autonomously generated seed poses. For example, the processor-based system or application autonomously determines whether any kinematic constraints for the robot being modeled are violated by the seed poses or transitions (e.g., edges) between the seed poses. Also for example, the processor-based system or application autonomously determines whether any collisions with objects (e.g., known static objects in the environment) would result from the seed poses or transitions between the seed poses.

At 516, if kinematic constraints are not violated and no collisions detected, the processor-based system or application adds the one or more seed poses and/or any associated edges to the motion planning graph, roadmap or lattice or to a region or sub-lattice of the motion planning graph, roadmap or lattice.

At 518, the processor-based system or application autonomously generates one or more additional poses and/or associated edges based on the seed poses. For example, the processor-based system or application may autonomously generate one or more neighboring poses and edges in a region or sub-lattice of the origin pose(s).

At 520, the processor-based system or application autonomously performs kinematic checking and/or collision checking of the autonomously generated additional poses and/or edges. For example, the processor-based system or application autonomously determines whether any kinematic constraints for the robot being modeled are violated by the additional poses or transitions (e.g., edges) between the seed pose and additional poses or transitions between additional poses. Also for example, the processor-based system or application autonomously determines whether any collisions with objects (e.g., known static objects in the environment) would result from the additional poses or transitions between the seed pose and additional poses or transitions between additional poses.

At 522, if kinematic constraints are not violated and no collisions detected, the processor-based system or application adds the one or more additional poses and/or associated edges to the motion planning graph, roadmap or lattice or to a region or sub-lattice of the motion planning graph, roadmap or lattice.

At 524, the system or application presents results via the user interface.

At 526, user input is received via the processor-based system or application, specifying adjustments to the robot model and/or the operational environment.

At 528, the system or application autonomously performs kinematic checking and/or collision checking based on the specified adjustments. For example, the system 200 autonomously determines whether any kinematic constraints for the robot being modeled are violated by based on the adjustment(s). Also for example, the system 200 identifies any of the edges of the first planning graph for which the corresponding transition would result in a collision between at least a portion of the robot 102 and at least a portion of at least one of the one or more obstacles in the environment. The system may determine a volume swept by the robot, or a portion thereof, in transitioning between a first pose represented as a first node, and a second pose represented by a second node, the transition represented as an edge between the first and second nodes.

At 530, if kinematic constraints are not violated and no collisions detected, the processor-based system or application updates the motion planning graph, roadmap or lattice or to a region or sub-lattice of the motion planning graph, roadmap or lattice to represent the adjustments.

At 532, the system or application presents results via the user interface. The method 500 of operation in a processor-based system 200 to facilitate motion planning concludes at 534, for example until invoked again. In some implementations, the method 500 may execute continually or execute as a thread on a multi-threaded processor.

FIG. 6 shows a method 600 of operation in a processor-based system, according to one illustrated embodiment, which may be employed in executing the method 500 illustrated in FIG. 5. The method 600 of operation in a processor-based system 200 commences at 602, for example in response to a call or invocation or powering on of a system.

In some implementations, an end user may seed each of two or more regions or sub-lattices of a motion planning graph, roadmap or lattice with seed or origin poses. The system or application can autonomously generate additional poses and/or edges for the respective regions or sub-lattices, perform kinematic and/or collision checking, and add the kinematic and/or collision checked additional poses and/or edges to the respective regions or sub-lattices. The system or application can then, either autonomously or guided by the end user, stitch the regions or sub-lattices together to form a fully connected motion planning graph, roadmap or lattice. For example, system or application can generate sub-lattice connecting poses and/or associated sub-lattice connecting edges, perform kinematic and/or collision checking, and add the kinematic and/or collision checked sub-lattice connecting poses and/or associated sub-lattice connecting edges to the motion planning graph, roadmap or lattice. For instance, the system or application may create a roadmap or sub-lattice for a particular region The system or application may then generate edges to one or more nearest hubs in the graph, for example directly connecting a hub point from a first region or sub-lattice with a hub point of a second region or sub-lattice. The system or application may then generate edges connecting hubs together, adding the edges if kinematic and/or collision checked detect no impossible poses or collisions.

At 604, the processor-based system or application receives input specifying one or more seed poses for a first region or sub-lattice of a motion planning graph, roadmap or lattice, for example as input via the user interface. The seed poses may be manually entered, or provided as a file or link to a file.

Optionally at 606, the processor-based system or application optionally autonomously performs kinematic checking and/or collision checking of the seed poses. For example, the processor-based system or application autonomously determines whether any kinematic constraints for the robot being modeled are violated by the seed poses or transitions between the seed poses. Also for example, the processor-based system or application autonomously determines whether any collisions with objects (e.g., known static objects in the environment) would result from the seed poses or transitions between the seed poses.

At 608, if kinematic constraints are not violated and no collisions detected, the processor-based system or application adds the one or more seed poses and any associated edges to the first region or first sub-lattice of the motion planning graph, roadmap or lattice.

At 610, the processor-based system or application autonomously generates one or more additional poses and/or associated edges based on the seed poses of the first region or first sub-lattice of the motion planning graph, roadmap or lattice. For example, the processor-based system or application may autonomously generate one or more neighboring poses in the first region or first sub-lattice of the seed or origin pose(s).

At 612, the processor-based system or application autonomously performs kinematic checking and/or collision checking of the autonomously generated additional poses and/or edges. For example, the processor-based system or application autonomously determines whether any kinematic constraints for the robot being modeled are violated by the additional poses or transitions between the seed pose and additional poses or transitions between additional poses. Also for example, the processor-based system or application autonomously determines whether any collisions with objects (e.g., known static objects in the environment) would result from the additional poses or transitions between the seed pose and additional poses or transitions between additional poses.

At 614, if kinematic constraints are not violated and no collisions detected, the processor-based system or application adds the one or more additional poses and any associated edges to the first region or first sub-lattice of the motion planning graph, roadmap or lattice.

At 616, the processor-based system or application receives input specifying one or more seed poses for a second region or sub-lattice of a motion planning graph, roadmap or lattice, for example as input via the user interface. The seed poses may be manually entered, or provided as a file or link to a file.

Optionally at 618, the processor-based system or application optionally autonomously performs kinematic checking and/or collision checking of the seed poses. For example, the processor-based system or application autonomously determines whether any kinematic constraints for the robot being modeled are violated by the seed poses or transitions between the seed poses. Also for example, the processor-based system or application autonomously determines whether any collisions with objects (e.g., known static objects in the environment) would result from the seed poses or transitions between the seed poses.

At 620, if kinematic constraints are not violated and no collisions detected, the processor-based system or application adds the one or more seed poses and any associated edges to the second region or second sub-lattice of the motion planning graph, roadmap or lattice.

At 622, the processor-based system or application autonomously generates one or more additional poses and/or associated edges based on the seed poses of the second region or second sub-lattice of the motion planning graph, roadmap or lattice. For example, the processor-based system or application may autonomously generate one or more neighboring poses in the second region or second sub-lattice of the seed or origin pose(s).

At 624, the processor-based system or application autonomously performs kinematic checking and/or collision checking of the autonomously generated additional poses and/or edges. For example, the processor-based system or application autonomously determines whether any kinematic constraints for the robot being modeled are violated by the additional poses or transitions between the seed pose and additional poses or transitions between additional poses. Also for example, the processor-based system or application autonomously determines whether any collisions with objects (e.g., known static objects in the environment) would result from the additional poses or transitions between the seed pose and additional poses or transitions between additional poses.

At 626, if kinematic constraints are not violated and no collisions detected, the processor-based system or application adds the one or more additional poses and any associated edges to the second region or second sub-lattice of the motion planning graph, roadmap or lattice.

At 628, the processor-based system or application autonomously generates one or more sub-lattice connecting poses and/or associated sub-lattice connecting edges to couple poses of the first region or first sub-lattice with poses of the second region or second sub-lattice, connecting or stitching together two or more regions or two or more sub-lattices of the motion planning graph, roadmap or lattice. For example, the processor-based system or application may autonomously generate one or more neighboring poses between the first and second regions or the first and second sub-lattices.

At 630, the processor-based system or application autonomously performs kinematic checking and/or collision checking of the autonomously generated sub-lattice connecting poses and/or sub-lattice connecting edges. For example, the processor-based system or application autonomously determines whether any kinematic constraints for the robot being modeled are violated by the sub-lattice connecting poses or transitions between the sub-lattice connecting poses or sub-lattice connecting transitions and the poses or edges of the respective regions or respective sub-lattices. Also for example, the processor-based system or application autonomously determines whether any collisions with objects (e.g., known static objects in the environment) would result from the sub-lattice connecting poses or sub-lattice connecting transitions between the sub-lattice connecting poses or transitions and the poses or edges of the respective regions or respective sub-lattices.

At 632, if kinematic constraints are not violated and no collisions detected, the processor-based system or application adds the one or more sub-lattice connecting poses and any associated sub-lattice connecting edges to the motion planning graph, roadmap or lattice.

The above example presents an implementation with only two regions or sub-lattices for clarity of explanation. One of skill in the art will recognize from the teachings herein that the same approach can be repeated to apply to more than two regions or sub-lattices.

The method 600 of operation in a processor-based system 200 to facilitate motion planning concludes at 634, for example until invoked again. In some implementations, the method 600 may execute continually or execute as a thread on a multi-threaded processor.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, CD ROMs and computer memory.

The various embodiments described above can be combined to provide further embodiments. All of the commonly assigned US patent application publications, US patent applications, foreign patents, and foreign patent applications referred to in this specification and/or listed in the Application Data Sheet, including but not limited U.S. patent application 62/626,939, filed Feb. 6, 2018; International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS,"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS" and International Patent Application Publication No. WO 2016/122840, filed Jan. 5, 2016, entitled "SPECIALIZED ROBOT MOTION PLANNING HARDWARE AND METHODS OF MAKING AND USING SAME" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based system to provide a user interface, the method comprising:
providing at least one user interface element that allows visual specification of one or more origin poses;
autonomously generating, by the processor-based system, a number of additional poses, the origin poses and the autonomously generated additional poses forming a group of poses;
autonomously generating, by the processor-based system, a number of edges, each edge identifying a transition between a respective pair of the poses of the group of poses which include the origin poses and the autonomously generated additional poses; and
causing, by the processor-based system, a visual presentation of at least one of: i) the additional poses and/or ii) the edges, the visually presented additional poses and/or edges being user selectable via the user interface.

2. The method of claim 1, further comprising:
autonomously performing kinematic checking by the processor-based system.

3. The method of claim 2 wherein autonomously performing kinematic checking includes autonomously performing kinematic checking of the autonomously generated additional poses by the processor-based system based on a geometry of a robot.

4. The method of claim 1, further comprising:
autonomously performing collision checking of each of the poses.

5. The method of claim 1, further comprising:
autonomously performing collision checking of each transition between respective pairs of the poses.

6. The method of claim 1, further comprising:
autonomously eliminating, by the processor-based system, any poses from the group of poses where a robot is in self collision or is in collision with an object in a workspace.

7. The method of claim 1, further comprising:
autonomously generating, by the processor-based system, a number of sub-lattice connecting poses that connect poses between a first sub-lattice and a second sub-lattice.

8. The method of claim 1, further comprising:
autonomously generating, by the processor-based system, a number of sub-lattice connecting edges that connect poses between a first sub-lattice and a second sub-lattice.

9. The method of claim 1 wherein causing a visual presentation of at least one of: i) the additional poses and/or ii) the edges includes providing a visual presentation that visually distinguishes valid poses from invalid poses.

10. The method of claim 1 wherein the providing at least one user interface element that allows visual specification of one or more origin poses, the autonomously generating a number of additional poses, and the autonomously generating a number of edges are all performed during a configuration time which occurs before a runtime.

11. A processor-based system comprising:
at least one processor; and
at least one nontransitory processor-readable medium that stores at least one of processor-executable instructions or data which, when executed by the at least one processor, causes the at least one processor to:
provide a graphical user interface;
receive specification of one or more origin poses;
autonomously generate a number of additional poses, the origin poses and the autonomously generated additional poses forming a group of poses;
autonomously generate a number of edges, each edge identifying a transition between a respective pair of the poses of the group of poses which include the origin poses and the autonomously generated additional poses;
cause a visual presentation of at least one of: i) the additional poses and/or ii) the edges, the visually presented additional poses and/or edges being user selectable via the user interface.

12. The processor-based system of claim 11 wherein, when executed by the at least one processor, the at least one of processor-executable instructions or data causes the at least one processor further to:
autonomously perform kinematic checking.

13. The processor-based system of claim 12 wherein to autonomously perform kinematic checking the at least one processor autonomously performs kinematic checking of the autonomously generated additional poses based on a geometry of a robot.

14. The processor-based system of claim 11 wherein, when executed by the at least one processor, the at least one of processor-executable instructions or data causes the at least one processor further to:
autonomously perform collision checking of each of the poses.

15. The processor-based system of claim 11 wherein, when executed by the at least one processor, the at least one of processor-executable instructions or data causes the at least one processor further to:
autonomously perform collision checking of each transition between respective pairs of the poses.

16. The processor-based system of claim 11 wherein, when executed by the at least one processor, the at least one of processor-executable instructions or data causes the at least one processor further to:
autonomously eliminate any poses from the group of poses where a robot is in self collision or is in collision with an object in a workspace.

17. The processor-based system of claim 11, wherein, when executed by the at least one processor, the at least one of processor-executable instructions or data causes the at least one processor further to:
autonomously generate a number of sub-lattice connecting poses that connect poses between a first sub-lattice and a second sub-lattice.

18. The processor-based system of claim 11, wherein, when executed by the at least one processor, the at least one of processor-executable instructions or data causes the at least one processor further to:
autonomously generate a number of sub-lattice connecting edges that connect poses between a first sub-lattice and a second sub-lattice.

19. The processor-based system of claim 11, wherein, when executed by the at least one processor, the at least one of processor-executable instructions or data causes the at least one processor to cause a visual presentation that visually distinguishes valid poses from invalid poses.

20. The processor-based system of claim 11, wherein, when executed by the at least one processor, the at least one of processor-executable instructions or data causes the at least one processor to, during a configuration time which occurs before a runtime: provide the at least one user interface that allows visual specification of one or more origin poses, autonomously generate the number of additional poses, and autonomously generate the number of edges all performed during the configuration time which occurs before the runtime.

* * * * *